United States Patent
Machida

(10) Patent No.: US 12,145,542 B2
(45) Date of Patent: Nov. 19, 2024

(54) WIPER DEVICE

(71) Applicant: MITSUBA Corporation, Gunma (JP)

(72) Inventor: Shinichi Machida, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/036,641

(22) PCT Filed: Sep. 22, 2022

(86) PCT No.: PCT/JP2022/035393
§ 371 (c)(1),
(2) Date: May 11, 2023

(87) PCT Pub. No.: WO2023/063047
PCT Pub. Date: Apr. 20, 2023

(65) Prior Publication Data
US 2023/0415702 A1    Dec. 28, 2023

(30) Foreign Application Priority Data

Oct. 14, 2021   (JP) ................................ 2021-168843

(51) Int. Cl.
   *B60S 1/40*         (2006.01)
   *B60S 1/04*         (2006.01)
(Continued)

(52) U.S. Cl.
CPC ........... *B60S 1/4009* (2013.01); *B60S 1/0444* (2013.01); *B60S 1/345* (2013.01); *B60S 1/38* (2013.01);
(Continued)

(58) Field of Classification Search
CPC ........ B60S 1/4009; B60S 1/4006; B60S 1/40; B60S 1/3486; B60S 1/3849; B60S 1/3865;
(Continued)

(56) References Cited

U.S. PATENT DOCUMENTS 2,025,888 A * 12/1935 Olivero ..................... B60S 1/38
                                             15/250.4
2,086,453 A * 7/1937 Ward ........................ B60S 1/38
                                             15/250.32
(Continued)

FOREIGN PATENT DOCUMENTS

DE        102015012610      3/2017
GB           489352    *   7/1938
(Continued)

OTHER PUBLICATIONS

Machine translation of description portion of Japanese publication H07186894, published Jul. 1995. (Year: 1995).*
(Continued)

*Primary Examiner* — Gary K. Graham
(74) *Attorney, Agent, or Firm* — JCIPRNET

(57) ABSTRACT

An inclination mechanism TM1 is provided at a wiper blade 30. The inclination mechanism TM1 inclines the wiper blade 30 with respect to a surface 11a, so that a center Ct1 of a U-shaped hook part 23b is disposed forward in a wiping direction with respect to a center Ct2 of a blade rubber 50. Accordingly, at the time of each of forward wiping and return wiping of the wiper blade 30, it is possible to correctly incline the blade rubber 50 with respect to the surface 11 a.

1 Claim, 16 Drawing Sheets

(51) Int. Cl.
  *B60S 1/34* (2006.01)
  *B60S 1/38* (2006.01)
(52) U.S. Cl.
  CPC ............. *B60S 1/40* (2013.01); *B60S 1/4041* (2013.01); *B60S 1/3486* (2013.01); *B60S 2001/382* (2013.01); *B60S 2001/3824* (2013.01); *B60S 1/3849* (2013.01); *B60S 1/3851* (2013.01); *B60S 1/3867* (2013.01); *B60S 1/4019* (2013.01)

(58) Field of Classification Search
  CPC ............ B60S 1/3867; B60S 2001/3812; B60S 2001/4025; B60S 1/3824; B60S 1/4019; B60S 2001/4012
  USPC ............... 15/250.43, 250.44, 250.32, 250.23
  See application file for complete search history.

(56) References Cited

U.S. PATENT DOCUMENTS

| | | | | |
|---|---|---|---|---|
| 2,087,686 | A | * | 7/1937 | Horton ..................... B60S 1/42 15/250.33 |
| 5,519,913 | A | * | 5/1996 | Schedule ............. B60S 1/3801 15/250.44 |

FOREIGN PATENT DOCUMENTS

| | | |
|---|---|---|
| JP | H07186894 | 7/1995 |
| JP | 2002012130 | 1/2002 |
| JP | 2007015636 | 1/2007 |
| JP | 2008238868 | 10/2008 |
| JP | 2016203712 | 12/2016 |
| WO | 9818663 | 5/1998 |

OTHER PUBLICATIONS

"International Search Report (Form PCT/ISA/210) of PCT/JP2022/035393", mailed on Nov. 8, 2022, with English translation thereof, pp. 1-4.

"International Preliminary Report on Patentability of PCT/JP2022/035393; this report contains the following items: Form PCT/IB/326, PCT/IB/338, PCT/IB/373, PCT/ISA237(cover sheet), PCT/ISA237(Box No. I), PCT/ISA237(Box No. V)", mailed on Apr. 25, 2024, Apr. 16, 2024 and Nov. 8, 2022, which is English translation of "Written Opinion of the International Searching Authority", p. 1-p. 13.

"Office Action of Germany Counterpart Application", with English translation thereof, issued on Jun. 28, 2024, pp. 1-14.

* cited by examiner (a)

(b)

WIPER DEVICE

CROSS-REFERENCE TO RELATED APPLICATION

This application is a 371 application of the International PCT application serial no. PCT/JP2022/035393, filed on Sep. 22, 2022, which claims the priority benefits of Japan Patent Application No. 2021-168843, filed on Oct. 14, 2021. The entirety of each of the above-mentioned patent applications is hereby incorporated by reference herein and made a part of this specification.

TECHNICAL FIELD

The invention relates to a wiper device that wipes a wiping surface through a swing movement of a swing shaft.

RELATED ART

Conventionally, in a vehicle such as an automobile, a wiper device that wipes rainwater, dust, etc., attached to a surface (wiping surface) of a windshield is mounted. The wiper device includes: a wiper arm in which a proximal end side is fixed to a swing shaft; and a wiper blade installed to a distal end side of the wiper arm. In addition, by swinging the swing shaft through driving of a wiper motor mounted to the vehicle, the wiper blade performs a reciprocal wiping operation on the windshield and wipes the rainwater, dust, etc., attached to the surface of the windshield.

Patent Document 1, for example, discloses such wiper device. In the wiper device disclosed in Patent Document 1, a pair of chatter suppression parts abutting against two sidewall outer surfaces of a linking block are provided at an arm cover, and the linking block is held by the chatter suppression parts. Accordingly, the chatter phenomenon of the wiper blade is suppressed, and the quietness of the wiper device is facilitated.

PRIOR ART DOCUMENT(S)

Patent Document(s)

[Patent Document 1] Japanese Laid-open No. 2007-015636

SUMMARY OF INVENTION

Technical Problem

However, in the wiper device disclosed in Patent Document 1, the pair of chatter suppression parts are provided at the arm cover, and the linking block is held through the chatter suppression parts. Therefore, in addition to an increase in the number of parts, such as that an arm cover becomes necessary, the assembling operability is affected.

An objective of the invention is to provide a wiper device capable of suppressing the chatter phenomenon of a wiper blade and easily facilitating the quietness of the wiper device by using a simple configuration.

Means for Solving the Issues

An aspect of the invention provides a wiper device wiping a wiping surface through a swing movement of a swing shaft. The wiper device includes: a wiper arm, wherein a proximal end side is fixed to the swing shaft, and a blade installation part is provided on a distal end side; a wiper blade, having a blade rubber sliding on and contacting the wiping surface, and installed to the blade installation part; and an inclination mechanism, provided at the wiper arm or the wiper blade, and at least inclining the wiper blade with respect to the wiping surface so that a center of the blade installation part is disposed forward in a wiping direction with respect to a center of the blade rubber.

Inventive Effects

According to the invention, at the time of forward wiping or return wiping of the wiper blade, it is possible to correctly incline the blade rubber with respect to the wiping surface. Accordingly, the occurrence of issues such as the chatter phenomenon, poor reversing, premature wearing of rubber, and increased lift during high-speed traveling, etc., resulting from the blade rubber being unable to correctly incline with respect to the wiping surface can be suppressed. The quietness of the wiper device can be easily facilitated without adding a new part (such as the conventional arm cover).

DESCRIPTION OF EMBODIMENTS

In the following, Embodiment 1 of the invention will be described in detail with reference to the drawings.

Figure 1:
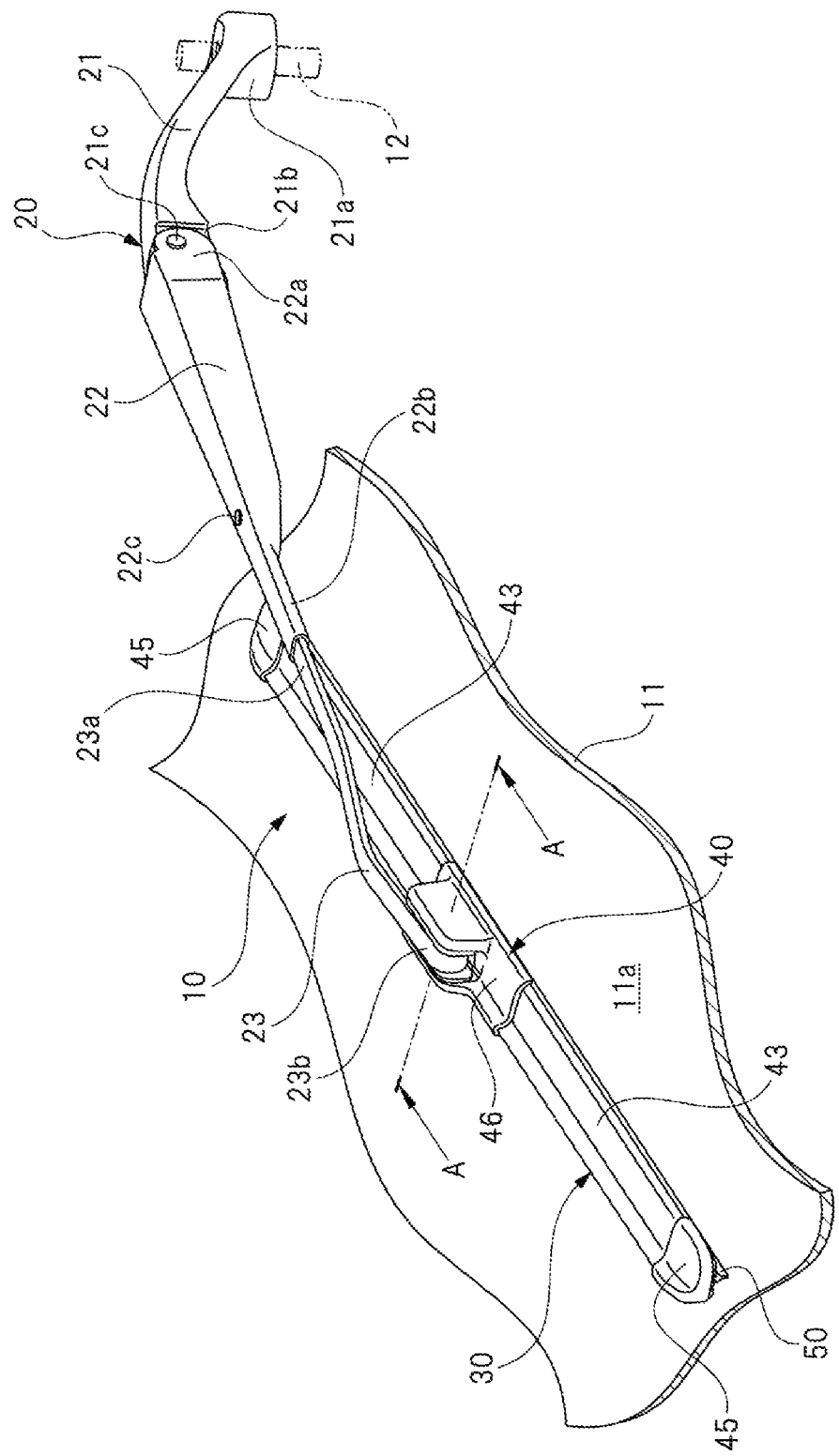
FIG. 1 is a perspective view illustrating a wiper device according to the invention.
Figure 2:
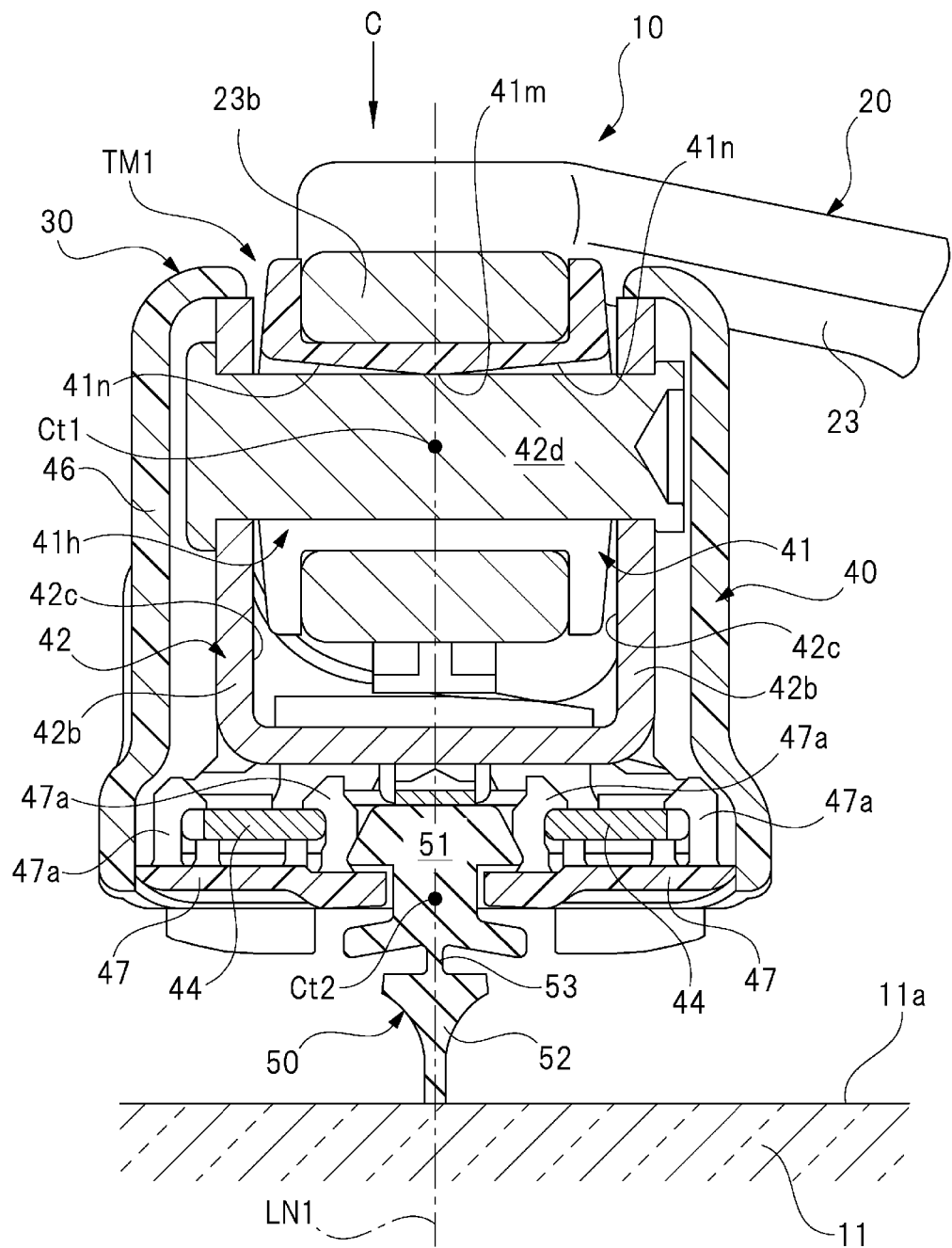
FIG. 2 is a cross-sectional view taken along a line A-A of FIG. 1.
Figure 3:
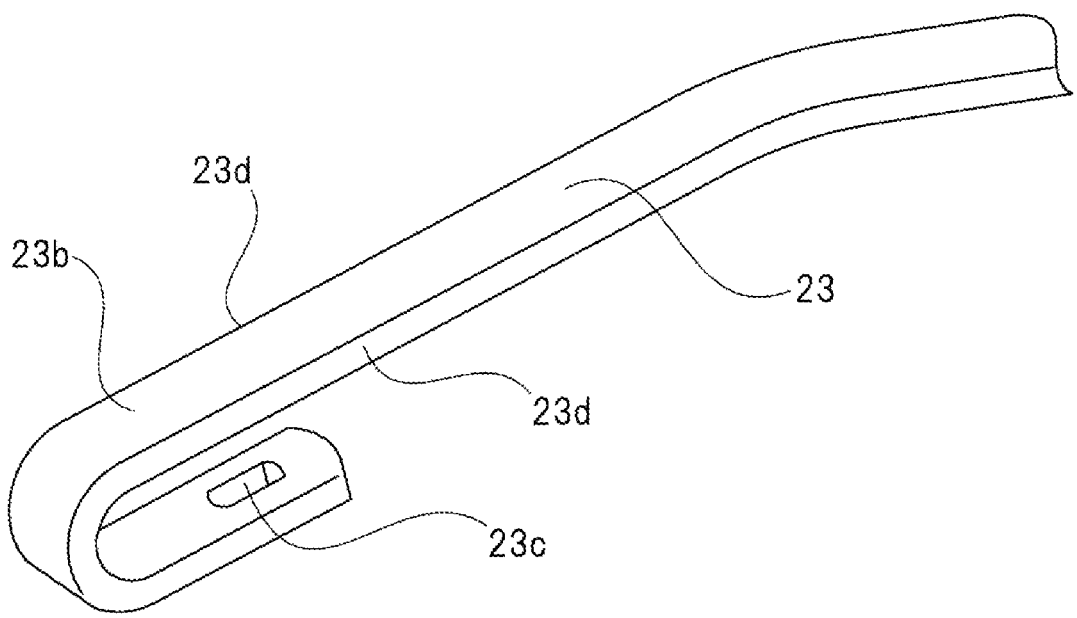
FIG. 3 is a perspective view illustrating a distal end side of an arm piece.
Figure 4:
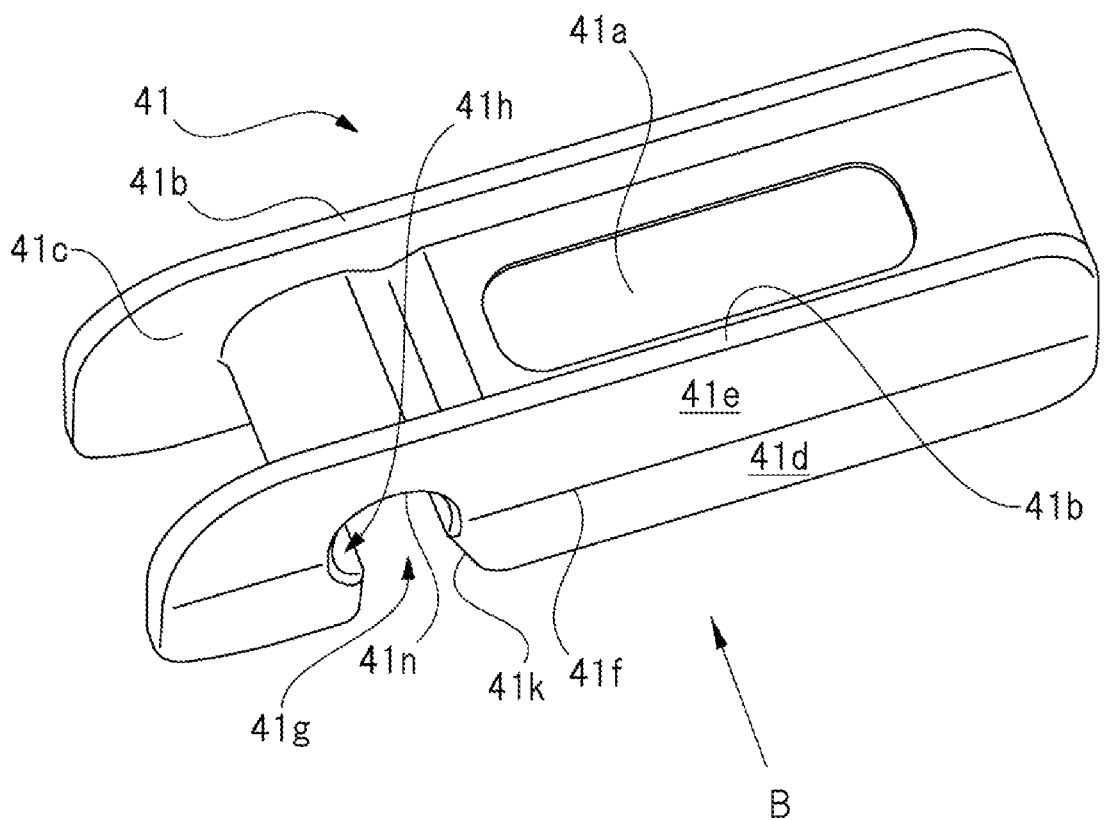
FIG. 4 is a perspective view illustrating a clip member when viewed from an arm piece side.
Figure 5:
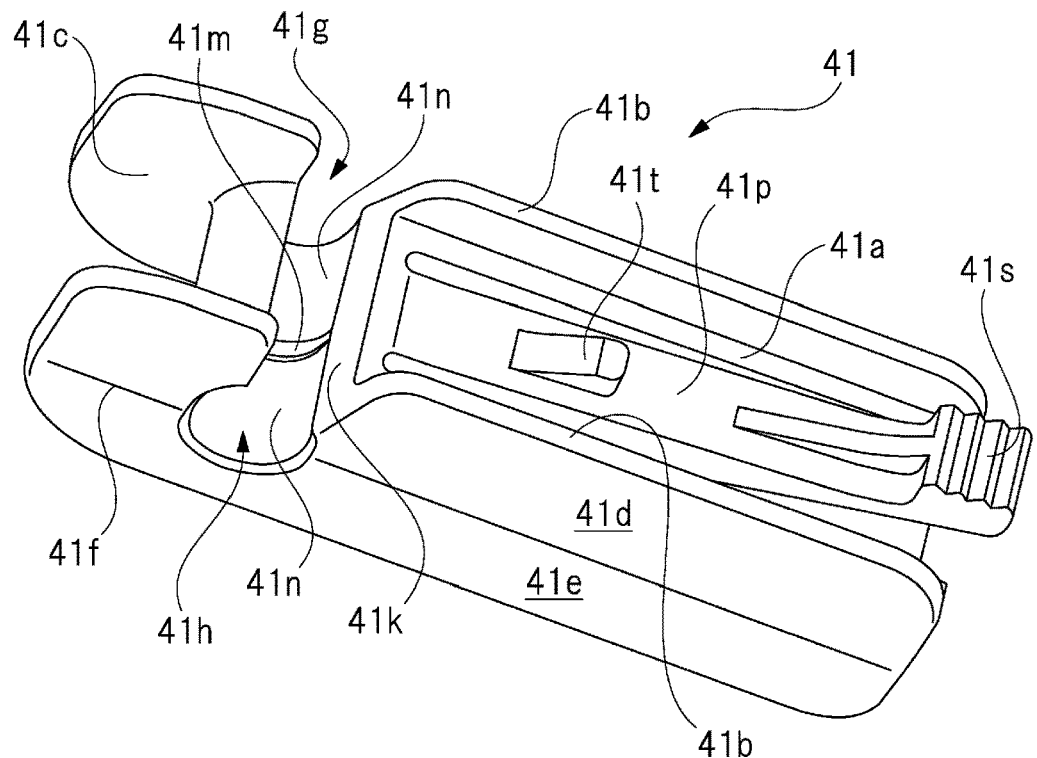
FIG. 5 is a perspective view illustrating the clip member when viewed from a windshield side.
Figure 6:
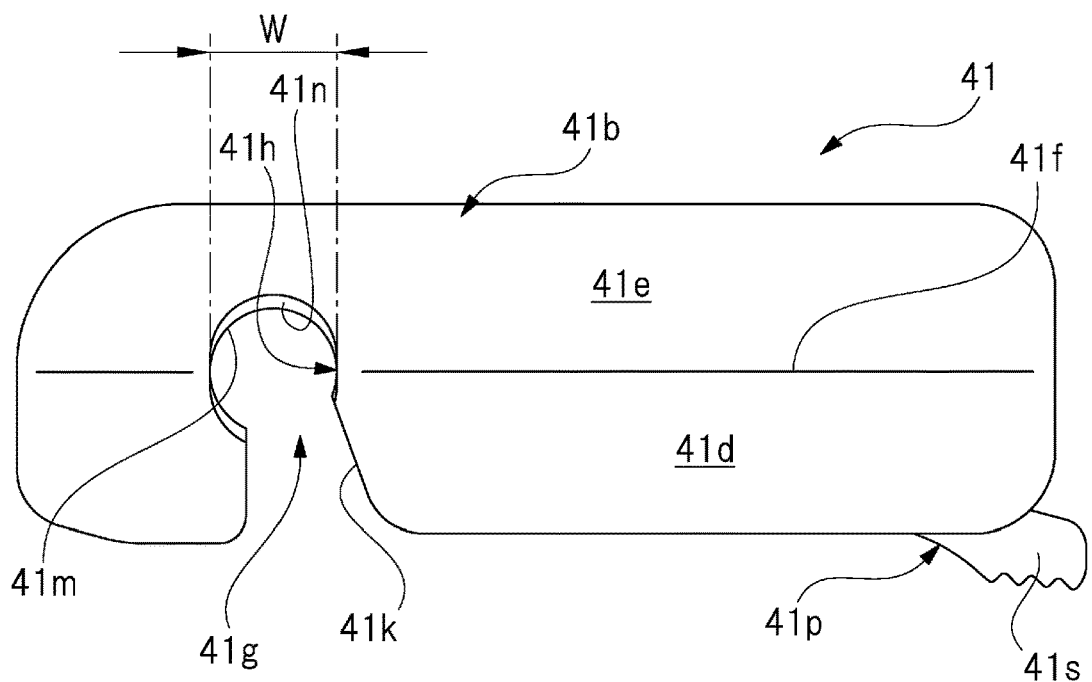
FIG. 6 is a view in a direction of an arrow B of FIG. 4.
Figure 7:
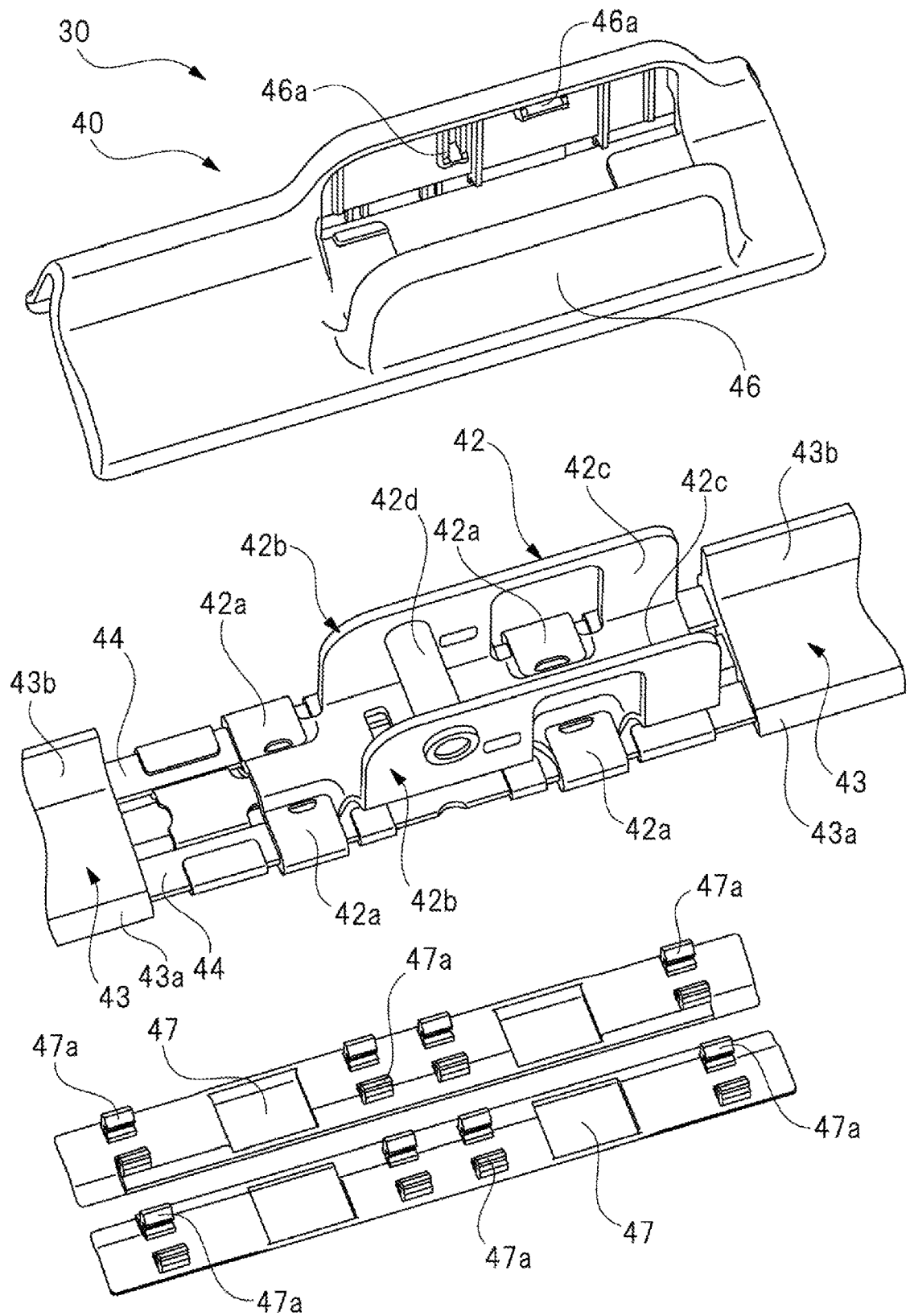
FIG. 7 is an exploded perspective view of a periphery of a support member.
Figure 8:
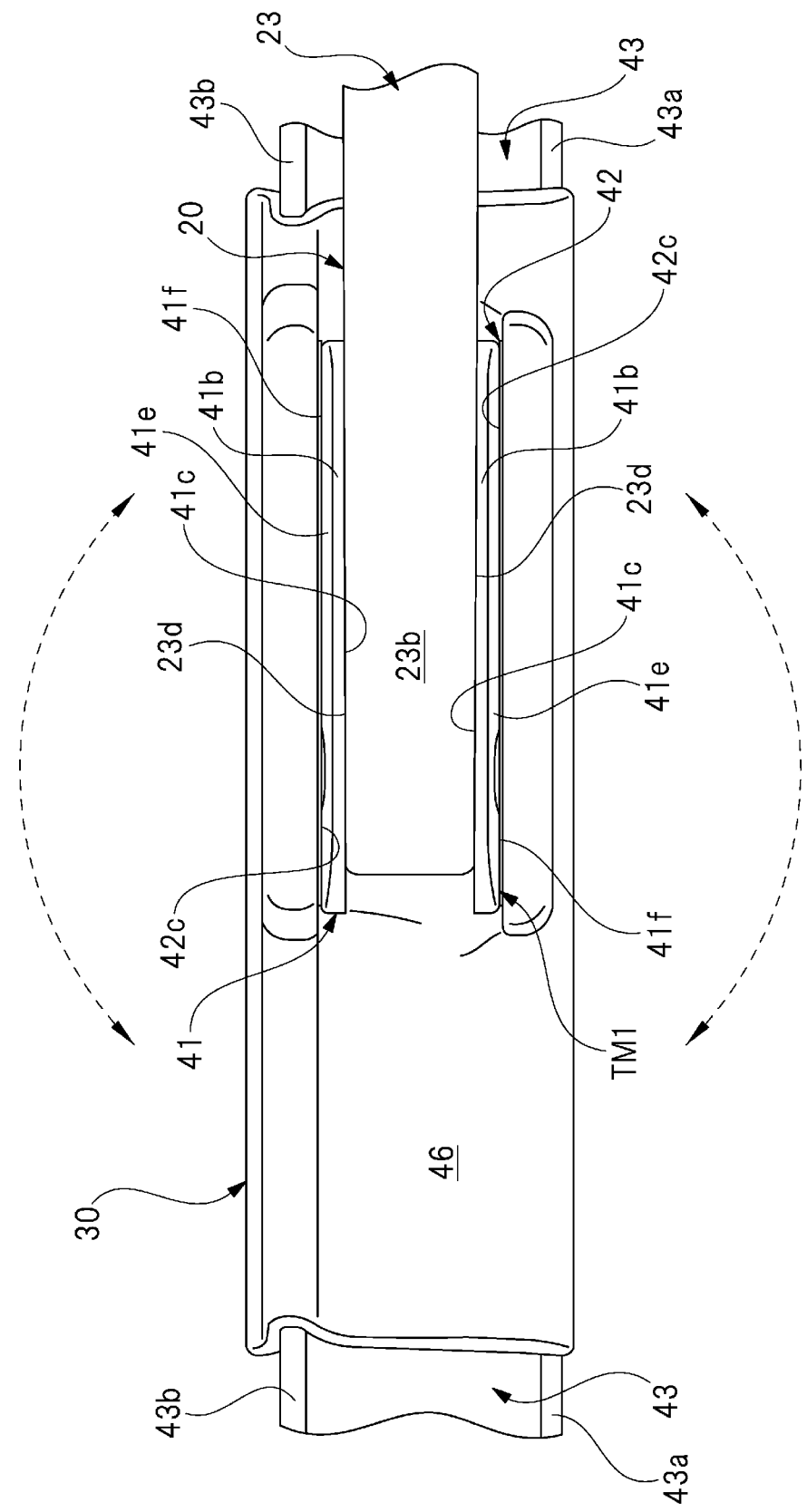
FIG. 8 is a view in a direction of an arrow C of FIG. 2.
Figure 9:
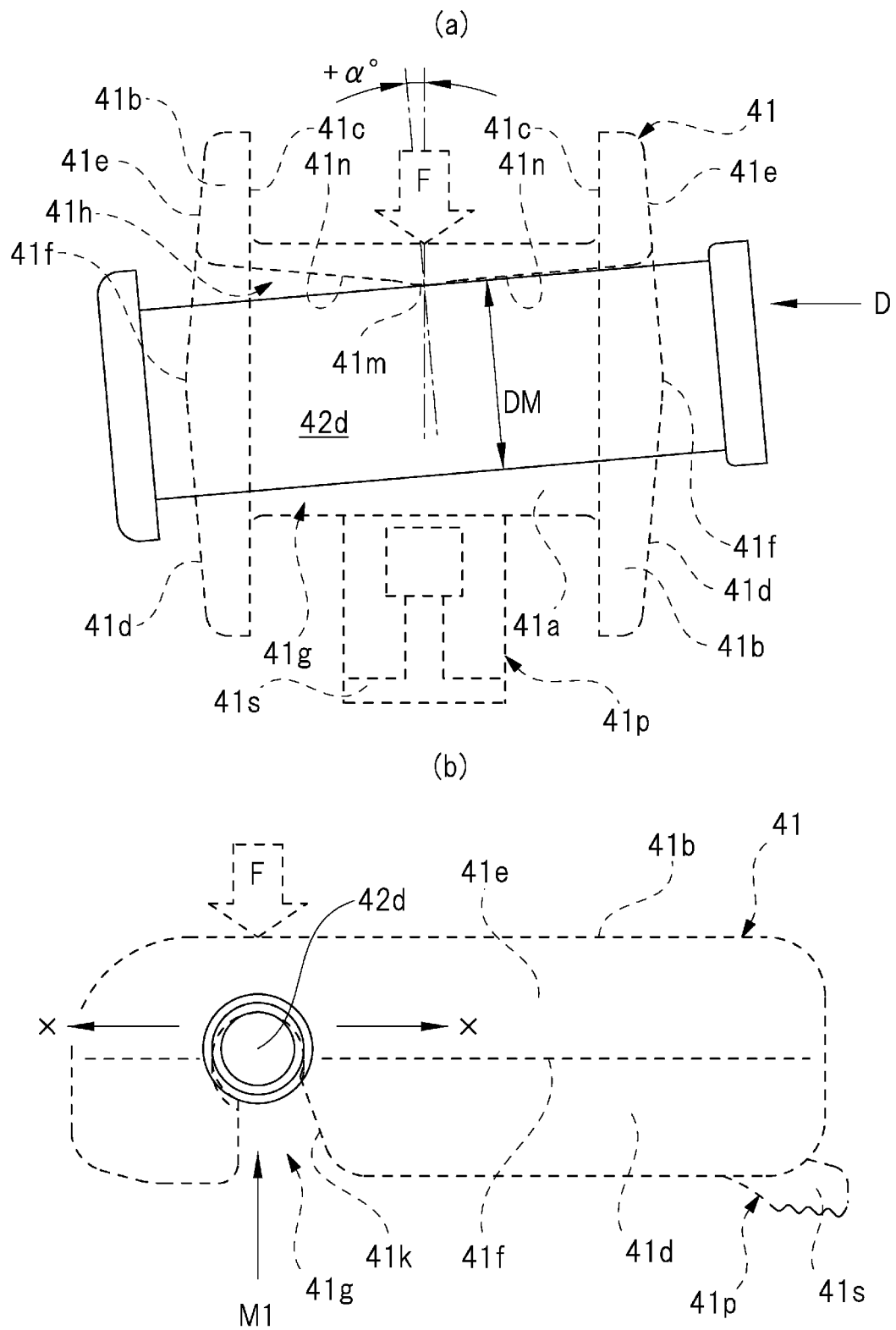
In FIG. 9, (a) of FIG. 9 is a view illustrating a state in which a linking pin is inclined in a counterclockwise direction with respect to the clip member, and (b) of FIG. 9 is a view in a direction of an arrow D of (a) of FIG. 9.
Figure 10:
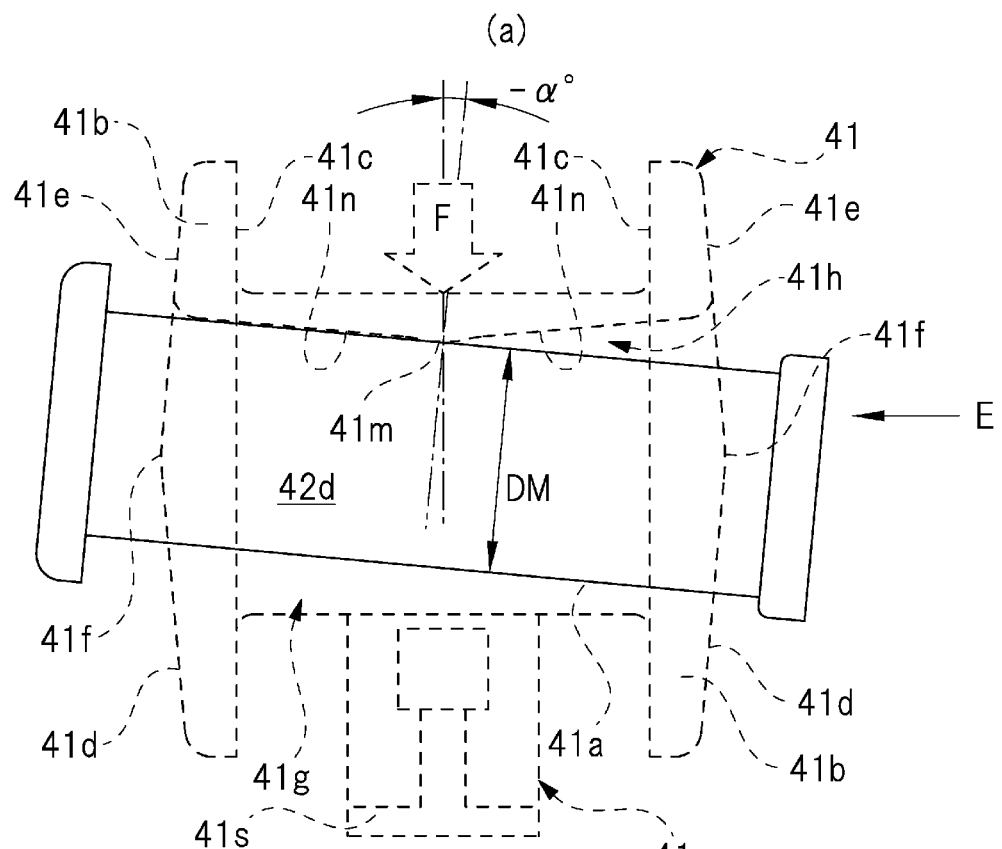
In FIG. 10, (a) of FIG. 10 is a view illustrating a state in which the linking pin is inclined in a clockwise direction with respect to the clip member, and (b) of FIG. 10 is a view in a direction of an arrow E of (a) of FIG. 10.
Figure 10:
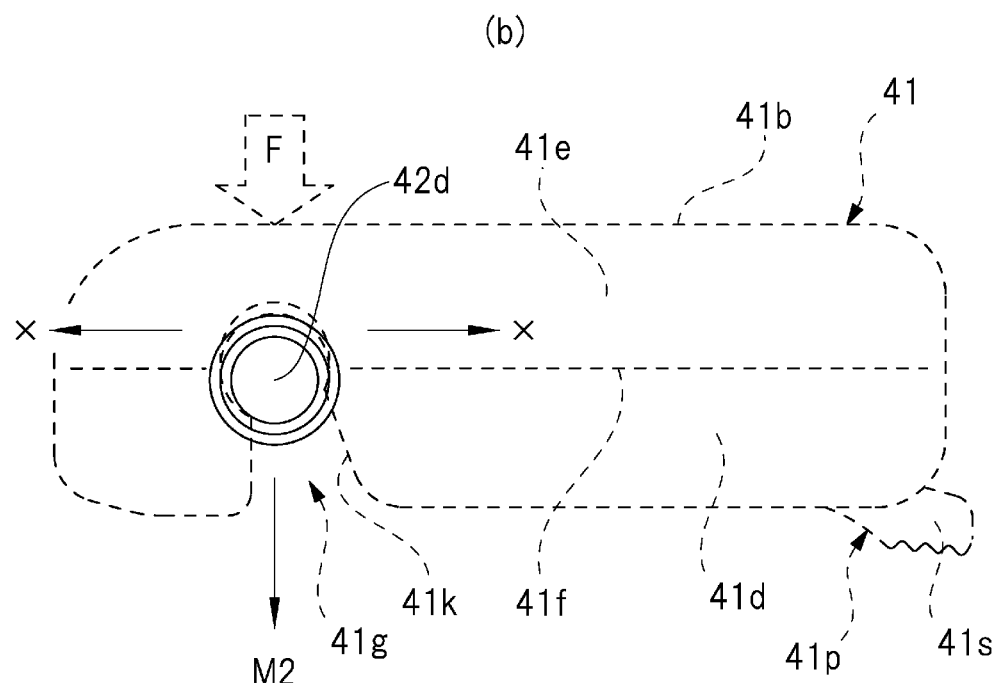
Figure 11:
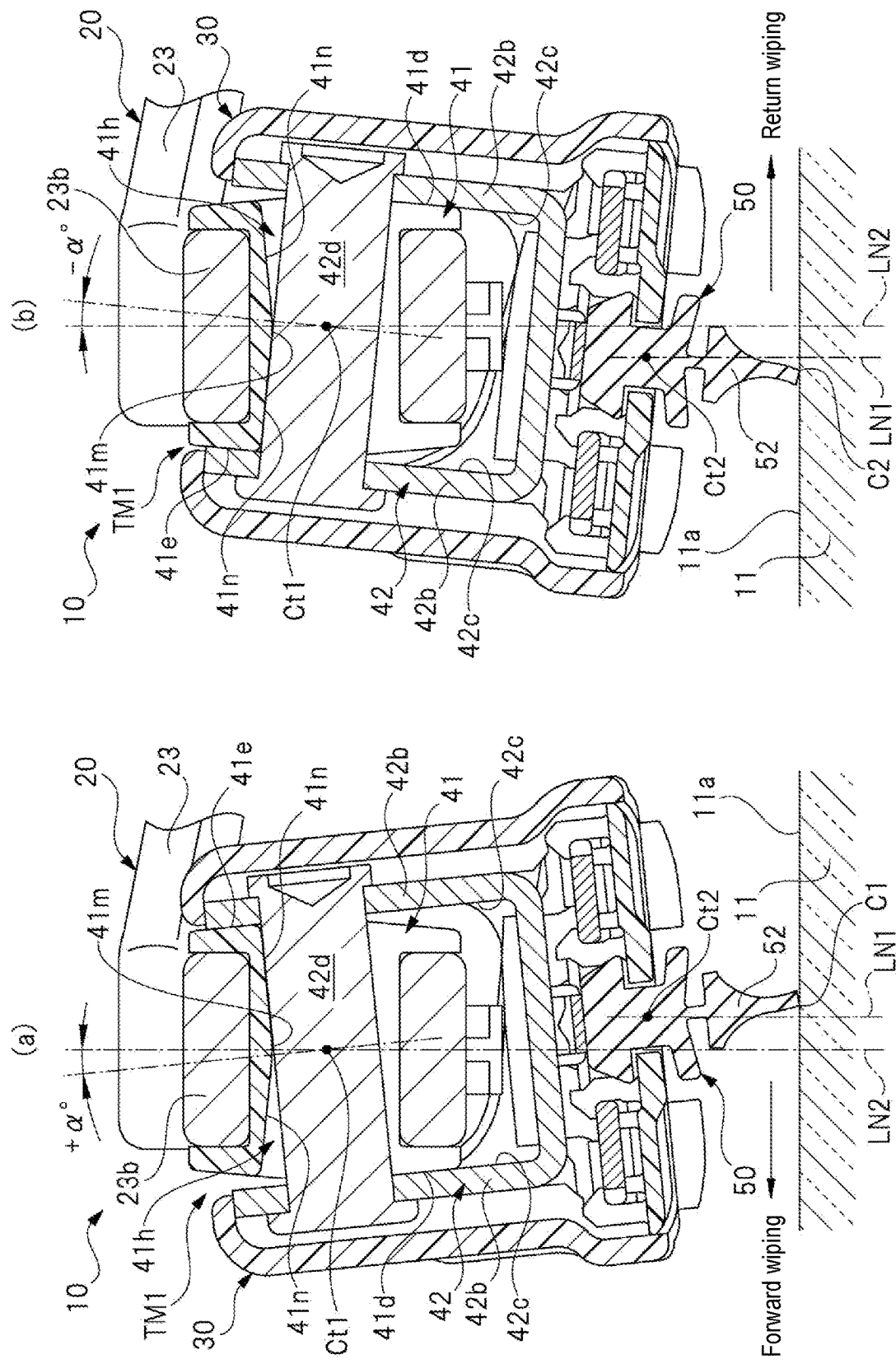
In FIG. 11, (a) and (b) of FIG. 11 are cross-sectional views illustrating an operation of the wiper device according to Embodiment 1.

FIG. 1 is a perspective view illustrating a wiper device according to the invention. FIG. 2 is a cross-sectional view taken along a line A-A of FIG. 1. FIG. 3 is a perspective view illustrating a distal end side of an arm piece. FIG. 4 is a perspective view illustrating a clip member when viewed from an arm piece side. FIG. 5 is a perspective view illustrating the clip member when viewed from a windshield side. FIG. 6 is a view in a direction of an arrow B of FIG. 4. FIG. 7 is an exploded perspective view of a periphery of a support member. FIG. 8 is a view in a direction of an arrow C of FIG. 2. In FIG. 9, (a) of FIG. 9 is a view illustrating a state in which a linking pin is inclined in a counterclockwise direction with respect to the clip member, and (b) of FIG. 9 is a view in a direction of an arrow D of (a) of FIG. 9. In FIG. 10, (a) of FIG. 10 is a view illustrating a state in which the linking pin is inclined in a clockwise direction with respect to the clip member, and (b) of FIG. 10 is a view in a direction of an arrow E of (a) of FIG. 10. In FIG. 11, (a) and (b) of FIG. 11 are respectively cross-sectional views illustrating an operation of the wiper device according to Embodiment 1.

As shown in FIGS. 1 and 2, a wiper device 10 swings on a windshield 11 provided on the front side of a vehicle (not shown), such as an automobile, and performs a reciprocal wiping operation on a surface (wiping surface) 11a of the windshield 11.

The wiper device 10 is formed in an elongated shape, and the proximal end side of the wiper device 10 is fixed, by using a fastening nut (not shown), etc., to a tip end part of a swing shaft 12 rotatably provided at a vehicle body (not shown). Accordingly, by driving a wiper motor (not shown) to swing the swing shaft 12, through a swing movement of the swing shaft 12, the wiper device 10 wipes the surface 11a of the windshield 11.

In the longitudinal direction thereof, the wiper device 10 includes a wiper arm 20 disposed on the side (right side of FIG. 1) of the swing shaft 12 and a wiper blade 30 disposed on the side (left side of FIG. 1) of the surface 11a of the windshield 11.

The wiper arm 20 includes an arm head 21, an arm shank 22, and an arm piece 23. Specifically, from the side of the swing shaft 12, the arm head 21, the arm shank 22, and the arm piece 23 are provided in order. The arm head 21 is formed in a curved, substantially rod shape by casting an aluminum material, etc. In this way, the weight of the arm head 21 is reduced, and the load taken by the wiper motor is reduced.

On the proximal end side (side of the swing shaft 12) of the arm head 21, a swing shaft linking part 21a formed in a substantially cylindrical shape is provided integrally. The distal end side of the swing shaft 12 is fixed to the swing shaft linking part 21a through serration mating, etc. Accordingly, the rotation force of the swing shaft 12 is reliably transmitted to the arm head 21.

On the distal end side of the arm head 21 (side of the surface 11a of the windshield 11), a shank linking part 21b to which the proximal end side of the arm shank 22 is provided integrally. At the shank linking part 21b, a pin member 21c extending in the transverse direction of the arm head 21 is provided, and a shank proximal end part 22a of the arm shank 22 is rotatably linked to the pin member 21c.

By performing a pressing process on a steel plate, the arm shank 22 is formed so that the cross-section in the transverse direction is formed in a substantially U shape. On the proximal end side of the arm shank 22, the shank proximal end part 22a linked with the shank linking part 21b of the arm head 21 is provided, and on the distal end side of the arm shank 22, a shank distal end part 22b to which a piece proximal end part 23a of the arm piece 23 is fixed is provided.

Here, on the inner side of the arm shank 22, a tension spring (not shown) is accommodated. A side of the tension spring in the longitudinal direction is hooked on the arm head 21, and the other side of the tension spring in the longitudinal direction is hooked on the arm shank 22. In the state in which the arm shank 22 is tilted with respect to the arm head 21 (state of FIG. 1), the tension spring presses the wiper blade 30 toward the surface 11a of the windshield 11, and in the state in which the arm shank 22 is arranged to stand with respect to the arm head 21 (lock-back state), the tension spring maintains the lock-back state.

As shown in FIG. 3, the arm piece 23 is formed in a predetermined shape by bending a steel plate thicker than the arm shank 22. On the proximal end side of the arm piece 23, the piece proximal end part 23a is provided (see FIG. 1), and the piece proximal end part 23a is fixed to the shank distal end part 22b of the arm shank 22 through a fixing pin 22c and caulking.

In addition, a U-shaped hook part 23b is integrally provided on the distal end side of the arm piece 23. In addition, a clip member 41 (see FIGS. 4 to 6) provided at the longitudinal direction central part of the wiper blade 30 is inserted and fixed to the inner side of the U-shaped hook part 23b. The U-shaped hook part 23b is equivalent to the blade installation part of the invention. An engagement hole 23c penetrating through the plate thickness direction is provided at the U-shaped hook part 23b, and an engagement claw 41t (see FIG. 5) provided at the clip member 41 is engaged with the engagement hole 23c. Accordingly, the clip member 41 is arranged in a state of being prevented from falling off from the arm piece 23.

In this way, the proximal end side of the wiper arm 20 in the longitudinal direction is fixed to the swing shaft 12, and the wiper blade 30 is installed to the U-shaped hook part 23b on the distal end side of the wiper arm 20 in the longitudinal direction.

As shown in FIGS. 1, 2, and 7, the wiper blade 30 includes a rubber holder 40 and a blade rubber 50. The rubber holder 40 holds the blade rubber 50 and is linked with the U-shaped hook part 23b of the arm piece 23. The rubber holder 40 includes the clip member 41, a vertebra holding member 42, a pair of holder members 43, a pair of vertebrae 44, a pair of end caps 45, a top cover 46, and a pair of bottom covers 47.

As shown in FIGS. 4 to 6, the clip member 41 includes a clip body 41a formed in a predetermined shape through injection molding of a resin material, such as plastics, and entering the inner side of the U-shaped hook part 23b (see FIG. 3) of the arm piece 23. A pair of sidewall parts 41b are respectively integrally provided at the clip body 41a. As shown in FIG. 6, the sidewall parts 41b are formed in a substantially rectangular shape when the clip member 41 is viewed from a lateral perspective (viewed in the direction of the arrow B of FIG. 4), and are disposed to face each other with the clip body 41a as the center.

On the inner sides of the pair of sidewall parts 41b, that is, the side of the clip body 41a, inner flat surfaces 41c are respectively provided. The inner flat surfaces 41c, as shown in FIGS. 3 and 8, support a pair of lateral surfaces 23d forming the U-shaped hook part 23b of the arm piece 23.

Accordingly, it is possible to install the clip member 41 to the arm piece 23 without wobbling (rattling) in the direction of a broken arrow of FIG. 8.

In addition, on the outer sides of the pair of sidewall parts 41b, that is, the side opposite to the side of the clip body 41a, a first inclined surface 41d and a second inclined surface 41e are respectively provided. The first and second inclined surfaces 41d and 41e are connected with each other at a gentle inclination angle (obtuse angle). The first inclined surface 41d is disposed on the side of the windshield 11 of the clip member 41 (lower side of FIG. 6), and the second inclined surface 41e is disposed on the side (upper side of FIG. 6) opposite to the side of the windshield 11.

In addition, as shown in (a) of FIG. 9 and (a) of FIG. 10, when the clip member 41 is viewed from the front, a connection part 41f between the first inclined surface 41d and the second inclined surface 41e serves as a most protruding portion to the lateral part of the clip member 41. Here, the connection part 41f is equivalent to the first abutting part of the invention, and extends in the longitudinal direction of the wiper blade 30.

In the state in which the click member 41 is installed to the vertebra holding member 42 (see FIG. 7), the pair of connection parts 41f provided at the clip member 41 respectively abut against inner wall parts 42c of the pair of pin support walls 42b of the vertebra holding member 42 (see FIG. 8). Accordingly, it is possible to install the clip member 41 to the vertebra holding member 42 without wobbling (rattling) in the direction of the broken arrow of FIG. 8.

Here, in a direction intersecting with the longitudinal direction of the wiper blade 30, on the two sides of the connection part 41f of the clip member 41, the first inclined surface 41d and the second inclined surface 41e are respectively disposed, and the first and second inclined surfaces 41d, 41e allow the inclination of the vertebra holding member 42 with respect to the clip member 41.

In addition, as shown in FIGS. 4 to 6, at the portions of the front sides of the clip body 41a and the pair of sidewall parts 41b, that is, at the portion of the U-shaped hook part 23b disposed to the bottom part side (left side of FIG. 3), a groove part 41g for insertion of a linking pin 42d (see FIG. 7) of the vertebra holding member 42 is provided. As shown in FIG. 6, the groove part 41g is formed in a substantially U shaped when the clip member 41 is viewed from the lateral side, and includes an engagement concave part 41h engaged with the linking pin 42d and an opening part 41k guiding the engagement of the linking pin 42d to the engagement concave part 41h.

The groove part 41g extends in the axial direction of the linking pin 42d, and the linking pin 42d engaged with the engagement concave part 41h, as shown in (a) of FIG. 9 to (b) of FIG. 11, is swingable within a predetermined angle range) (±α°) with respect to the surface 11a of the windshield 11. In other words, the linking pin 42d is inclinable with respect to the clip member 41 in the wiping direction. Here, in the embodiment, it is set that α° is about 5°.

At the central part of the engagement concave part 41h in the longitudinal direction (axial direction of the linking pin 42d), a pin support part 41m supporting the longitudinal direction central part of the linking pin 42d is provided. The pin support part 41m protrudes toward the windshield 11 (see FIG. 2 and (a) and (b) of FIG. 11), and swingably supports the linking pin 42d like a seesaw. Specifically, as shown in FIG. 2, on the two sides of the pin support part 41m in the longitudinal direction of the engagement concave part 41h, taper parts 41n whose gaps with the linking pin 42d gradually increase as the distance from the pin support part 41m increases are formed. Accordingly, as shown in (a) of FIG. 9 to (b) of FIG. 11, inside the engagement concave part 41h, the linking pin 42d is swingable like a seesaw.

As shown in FIG. 6, the pin support part 41m and the pair of taper parts 41n are provided at the bottom part side (upper side in the figure) of the engagement concave part 41h, and a width dimension W of the engagement concave part 41h is substantially equal to a diameter dimension DM (see (a) and (b) of FIG. 9 and (a) and (b) of FIG. 10) of the linking pin 42d (W≈DM). Specifically, the linking pin 42d forms a dimension relationship able to swing inside the engagement concave part 41h and not wobbling (rattling) in the direction of the broken arrow of FIG. 8.

In addition, as shown in FIG. 5, on the side of the windshield 11 in the clip body 41a (front side of FIG. 5) and the rear side of the clip body 41a with respect to the groove part 41g (right side of FIG. 5), an operation lever 41p operated by the operator when removing the wiper blade 30 attached to the arm piece 23 is integrally provided. The proximal end side (left side of FIG. 5) of the operation lever 41p is elastically deformable with respect to the clip body 41a, and on the distal end side (right side of FIG. 5) of the operation lever 41p, an operation part 41s pressed by the operator is integrally provided. In addition, on the proximal end side (left side of FIG. 5) of the operation lever 41p, the engagement claw 41t engaged with the engagement hole 23c (see FIG. 3) of the U-shaped hook part 23b is integrally provided.

Here, for releasing the engagement of the engagement claw 41t engaged with the engagement hole 23c of the U-shaped hook part 23b and removing the wiper blade 30 attached to the arm piece 23, it suffices as long as the operator performs a pressing operation on the operation part 41s with a predetermined pressure.

As shown in FIGS. 2 and 7, the vertebra holding member 42 is formed in a predetermined shape by punching and bending a steel plate, and holds the pair of vertebrae 44 at a predetermined interval. Specifically, the vertebra holding member 42 includes a total of four vertebra holding claws 42a. The vertebra holding claws 42a are respectively fixed to the pair of vertebrae 44 by caulking. Accordingly, the pair of vertebrae 44 are respectively firmly fixed to the vertebra holding member 42.

In addition, the vertebra holding member 42 includes the pair of pin support walls 42b. The pin support walls 42b stand with respect to the windshield 11, and on the inner sides of the pin support walls 42b, the inner wall parts 42c are formed. Between the pair of pin support walls 42b, that is, between the inner wall parts 42c facing each other, the connection pin 42d formed by a round steel rod is provided across. The two sides of the linking pin 42d in the longitudinal direction are fixed to the respective pin support walls 42b by caulking. The linking pin 42d is formed in a simple cylindrical columnar shape with the diameter dimension DM (see (a) and (b) of FIG. 9 and (a) and (b) of FIG. 10) being constant in the longitudinal direction thereof, and is engaged with the engagement concave part 41h (see FIG. 5) of the clip part 41.

Here, the vertebra holding member 42 is equivalent to the support member in the invention. In addition, the inner wall part 42c of the pin support wall 42b is equivalent to the second abutting part in the invention. That is, as shown in FIGS. 7 and 8, the inner wall part 42c extends in the longitudinal direction of the wiper blade 30, and the connection part 41f of the clip member 41 abuts against the inner wall part 42c (see FIG. 8).

As shown in FIGS. 1, 7, and 8, the pair of holder members 43 are provided on two sides of the vertebra holding member 42 in the longitudinal direction. The holder member 43 includes a holder body 43a made of rigid plastics and a fin part 43b made of a flexible elastic material (made of rubber). Specifically, the holder member 43 is formed in an elongated rod shape by extruding two molten materials.

Here, the holder body 43a is held by the pair of vertebrae 44 held by the vertebra holding member 42, and holds a body part 51 of the blade rubber 50 (see FIG. 2). That is, the vertebra holding member 42 supports the blade rubber 50 via the pair of vertebrae 44 and the pair of holder members 43.

In addition, the fin part 43b receives a running wind when the vehicle travels and applies a downforce to the blade rubber 50. In this way, the fin part 43b facilitates the wiping performance when the vehicle travels at a high speed while facilitating the appearance of the wiper device 10.

In addition, as shown in FIG. 1, the end caps 45 are installed to the respective holder members 43. Specifically, the end caps 45 are respectively installed to the sides of the holder members 43 in the longitudinal direction opposite to the side of the vertebra holding member 42 (longitudinal direction central part side of the wiper blade 30). The end caps 45 respectively cover and hide the end parts of the holder members 43, the vertebrae 44 and the blade rubber 50. In this way, the entire appearance of the wiper blade 30 is favorable.

Here, as shown in FIG. 2, the blade rubber 50 slides on and contacts the surface 11a, and includes the body part 51 held by the holder member 43 and a lip part 52 brought into contact with the surface 11a of the windshield 11. In addition, a thinned neck part 53 is provided between the body part 51 and the lip part 52. Accordingly, together with the movement of the wiper blade 30 toward the forward side and the return side (left and right sides of FIG. 2), the lip part 52 is inclined. Accordingly, the rainwater, dust, etc., attached to the surface 11a of the windshield 11 is wiped off cleanly.

In addition, the pair of vertebrae 44 holding the pair of holder members 43 are plate springs formed by punching stainless steel plates, etc., into a rod shape. The vertebrae 44 are provided throughout the entire region of the wiper blade 30 in the longitudinal direction, and the length dimension thereof is substantially equal to the length dimension of the wiper blade 30.

In a free state in which an external force is not applied, the vertebra 44 is curved at a predetermined curvature. Specifically, the curvature of the vertebra 44 is set to a curvature smaller than the curvature of the windshield 11. Accordingly, the entire region of the lip part 52 in the longitudinal direction is brought into close contact with the surface 11a of the windshield 11. That is, by setting the curvature of the vertebra 44 to be smaller than the curvature of the windshield 11, a sufficient wiping performance of the wiper blade 30 is secured.

As shown in FIGS. 2 and 7, the top cover 46 is installed to the vertebra holding member 42. The top cover 46 is formed in a predetermined shape by using a resin material such as plastics, and covers the periphery of the vertebra holding member 42. Accordingly, the appearance of the periphery of the vertebra holding member 42 in the wiper blade 30 is favorable. It is noted that the top cover 46 includes multiple (two in FIG. 7) first cover claws 46a. In addition, by hooking the first cover claws 46a to the pin support wall 42b of the vertebra holding member 42, the top cover 46 is fixed to the vertebra holding member 42.

In addition, the pair of bottom covers 47 are installed to the side opposite to the side of the top cover 46 in the vertebra holding member 42, that is, the side of the windshield 11. The bottom covers 47 are formed in a substantially rod shape by using a resin material such as plastics, and cover the side of the windshield 11 in the vertebra holding member 42. Multiple second cover claws 47a are respectively provided at the pair of bottom covers 47. Specifically, a total of eight second cover claws 47a are provided for each bottom cover 47. In addition, as shown in FIG. 2, the second cover claws 47a are respectively hooked to the pair of vertebrae 44.

In this way, the top cover 46 is fixed to the vertebra holding member 42, and the pair of bottom covers 47 are respectively fixed to the pair of vertebrae 44. Accordingly, the exposed portions of the vertebra holding member 42 and the pair of vertebrae 44 made of metal are covered, and the entire appearance of the wiper blade 30 is favorable.

Here, in the embodiment, an inclination mechanism TM1 is formed by the clip member 41 and the vertebra holding member 42. The clip member 41 is installed to the U-shaped hook part 23b of the arm piece 23 (see FIG. 3). The vertebra holding member 42 has the linking pin 42d rotatably linked with the clip member 41 and supports the blade rubber 50.

That is, in the embodiment, the inclination mechanism TM1 is provided at the wiper blade 30. Specifically, as shown in (a) and (b) of FIG. 11, the linking pin 42d of the vertebra holding member 42 is inclinable in the wiping direction (left-right direction in the figure) with respect to the clip member 41.

In the following, the operation (inclination state) of the inclination mechanism TM1 in the embodiment will be described in detail with reference to (a) of FIG. 9 to (b) of FIG. 11.

[Forward Wiping]

Firstly, when the wiper motor (not shown) is driven to rotate the swing shaft 12 (see FIG. 1) in the positive direction (clockwise direction), the wiper device 10 formed by the wiper arm 20 and the wiper blade 30 starts the forward wiping operation. Then, as shown in (a) of FIG. 11, through the driving force of the wiper arm 20, the wiper blade 30 is pulled and moved in the forward wiping direction (left side in the figure). Accordingly, the lip part 52 of the blade rubber 50 is inclined, and a first corner part C1 of the lip part 52 on the forward wiping side slides on and contacts the surface 11a of the windshield 11. Accordingly, the rainwater, dust, etc., attached to the surface 11a is wiped off cleanly.

At this time, between the first corner part C1 of the lip part 52 and the surface 11a, a friction force (dynamic friction force) occurs to a certain extent. In addition, from the wiper arm 20 to the wiper blade 30, through a spring force of the tension spring, a pressing force F as shown in (a) of FIG. 9 acts toward the windshield 11. Accordingly, the inclination mechanism TM1 operates, and the wiper blade 30 forms a posture as shown in (a) of FIG. 11 with respect to the wiper arm 20.

Specifically, as shown in (a) of FIG. 9 and (a) of FIG. 11, the outer peripheral portion of the linking pin 42d abuts against the taper part 41n of the side (right side in the figure) opposite to the forward wiping direction side in the pair of taper parts 41n of the clip member 41. More specifically, the wiper blade 30 is inclined by +α° with respect to the wiper arm 20. At this time, since the wiper blade 30 is pressed by the wiper arm 20 by using the pressing force F, etc., the linking pin 42d does not come off from the engagement concave part 41h.

In addition, the first inclined surface 41*d* on the forward wiping direction side (left side in the figure) abuts against the inner wall part 42*c*, and the second inclined surface 41*e* on the side (right side in the figure) opposite to the forward wiping direction side abuts against the inner wall part 42*c*. Accordingly, a further inclination (inclination of about 5° or more) of the wiper blade 30 with respect to the wiper arm 20 is prevented, thereby avoiding the deterioration of wiping performance.

That is, the first and second inclined surfaces 41*d*, 41*e* provided at the clip member 41 and the inner wall part 42*c* of the pin support wall 42*b* provided at the vertebra holding member 42 are equivalent to the inclination angle limitation part that limits the maximum inclination angle of the wiper blade 30 with respect to the surface 11*a*.

In this way, through the movement toward the forward wiping direction, as shown in (a) of FIG. 11, the inclination mechanism TM1 formed by the clip member 41 and the vertebra holding member 42 inclines the wiper blade 30 with respect to the surface 11*a* of the windshield 11, so that a center Ct1 of the U-shaped hook part 23*b* is disposed forward (left side in the figure) in the wiping direction with respect to a center Ct2 of the blade rubber 50. In this way, it is possible to correctly incline the blade rubber 50 with respect to the surface 11*a*, and the first corner part C1 of the lip part 52 can smoothly slide on and contact the surface 11*a* without occurrence of the chatter phenomenon, and can cleanly wipe off rainwater, dust, etc.

When viewed from the rear in the wiping direction (the direction of an arrow D in (a) of FIG. 9), an end of the linking pin 42*d* in the axial direction at this time is moved as shown in an arrow M1 in (b) of FIG. 9. However, the linking pin 42*d* does not move in the longitudinal direction of the clip member 41 as indicated by an arrow "x" in (b) of FIG. 9.

Then, the wiper device 10 performs a reverse operation at a reversal position on the windshield 11. Specifically, the wiper device 10 proceeds to the return wiping operation (see (a) of FIG. 10 and (b) of FIG. 11) from the forward wiping operation (see (a) of FIG. 9 and (a) of FIG. 11). At this time, the wiper blade 30 is inclinable with respect to the wiper arm 20 within the predetermined angle range)(±α°. Therefore, a situation in which the blade cover 50 cannot be reversed correctly and the first corner part C1 of the lip part 52 keeps contacting the surface 11*a* is reliably prevented.

Here, in the case where the blade rubber 50 cannot be reversed correctly, that is, when the first corner part C1 of the lip part 52 keeps contacting the surface 11*a* as shown in (a) of FIG. 11 and proceeds to the return wiping operation as shown in (b) of FIG. 11, the chatter phenomenon may aggravate, a damage to the blade rubber 50 may be induced, and a loud noise may occur. Therefore, it is important to correctly (accurately) reverse the blade rubber 50 not only at the upper reversal position but also at the lower reversal position.

[Return Wiping]

Then, when the swing shaft 12 rotates in the reverse direction (counterclockwise direction) through the driving of the wiper motor, the wiper device 10 formed by the wiper arm 20 and the wiper blade 30 starts the return wiping operation. Then, as shown in (b) of FIG. 11, through the driving force of the wiper arm 20, the wiper blade 30 is pulled and moved in the return wiping direction (right side in the figure). Accordingly, the lip part 52 of the blade rubber 50 is inclined, and a second corner part C2 of the lip part 52 on the return wiping side slides on and contacts the surface 11*a* of the windshield 11. Accordingly, the rainwater, dust, etc., attached to the surface 11*a* is wiped off cleanly.

At this time, between the second corner part C2 of the lip part 52 and the surface 11*a*, a friction force (dynamic friction force) occurs to a certain extent. In addition, from the wiper arm 20 to the wiper blade 30, through the spring force of the tension spring, the pressing force F as shown in (a) of FIG. 10 acts toward the windshield 11. Accordingly, the inclination mechanism TM1 operates, and the wiper blade 30 forms a posture as shown in (b) of FIG. 11 with respect to the wiper arm 20.

Specifically, as shown in (a) of FIG. 10 and (b) of FIG. 11, the outer peripheral portion of the linking pin 42*d* abuts against the taper part 41*n* of the side (left side in the figure) opposite to the return wiping direction side in the pair of taper parts 41*n* of the clip member 41. More specifically, the wiper blade 30 is inclined by −α° with respect to the wiper arm 20. At this time, since the wiper blade 30 is pressed by the wiper arm 20 by using the pressing force F, etc., the linking pin 42*d* does not come off from the engagement concave part 41*h*.

In addition, the first inclined surface 41*d* on the return wiping direction side (right side in the figure) abuts against the inner wall part 42*c*, and the second inclined surface 41*e* on the side (left side in the figure) opposite to the return wiping direction side abuts against the inner wall part 42*c*. Accordingly, a further inclination (inclination of about 5° or more) of the wiper blade 30 with respect to the wiper arm 20 is prevented, thereby avoiding the deterioration of wiping performance.

In this way, through the movement toward the return wiping direction, as shown in (b) of FIG. 11, the inclination mechanism TM1 formed by the clip member 41 and the vertebra holding member 42 inclines the wiper blade 30 with respect to the surface 11*a* of the windshield 11, so that the center Ct1 of the U-shaped hook part 23*b* is disposed forward (right side in the figure) in the wiping direction with respect to the center Ct2 of the blade rubber 50. In this way, it is possible to correctly incline the blade rubber 50 with respect to the surface 11*a*, and the second corner part C2 of the lip part 52 can smoothly slide on and contact the surface 11*a* without occurrence of the chatter phenomenon, and can cleanly wipe off rainwater, dust, etc.

When viewed from the front in the wiping direction (the direction of an arrow E in (a) of FIG. 10), an end of the linking pin 42*d* in the axial direction at this time is moved as shown in an arrow M2 in (b) of FIG. 10. However, the linking pin 42*d* does not move in the longitudinal direction of the clip member 41 as indicated by an arrow "x" in (b) of FIG. 10.

Here, the wiper device 10 as shown in FIG. 2 illustrates the case of "reference state" in which the wiper blade 30 is not inclined with respect to the wiper arm 20. That is, in the wiper device 10 of the "reference state" shown in FIG. 2, the center Ct1 of the U-shaped hook part 23*b* is not in the state of being disposed forward (left or right side in the figure) in the wiping direction with respect to the center Ct2 of the blade rubber 50. Specifically, in the "reference state", both of the center Ct1 of the U-shaped hook part 23*b* and the center Ct2 of the blade rubber 50 are disposed on a vertical line LN1 of the windshield 11.

In addition, as described above, when the wiper blade 30 is in an "inclined state" that is inclined with respect to the wiper arm 20 during forward wiping or return wiping, the position relationship between the center Ct1 of the U-shaped hook part 23*b* and the center Ct2 of the blade rubber 50 is as shown in (a) of FIG. 11 and (b) of FIG. 11. Specifically, although the center Ct2 of the blade rubber 50 is on the vertical line LN1, the center Ct1 of the U-shaped hook part 23b is deviated from the vertical line LN1 and moved to a vertical line LN2 forward in the wiping direction.

In this way, the inclination mechanism TM1 is provided with a function of inclining the wiper blade 30 with respect to the surface 11a of the windshield 11, so that the center CT1 of the U-shaped hook part 23b is disposed forward in the wiping direction with respect to the center Ct2 of the blade rubber 50, that is, so that the center Ct1 of the U-shaped hook part 23b moves forward in the wiping direction with respect to the center Ct2 of the blade rubber 50.

As described above, according to the wiper device 10 according to the embodiment, the inclination mechanism TM1 is provided in the wiper blade 30. The inclination mechanism TM1 inclines the wiper blade 30 with respect to the surface 11a, so that the center Ct1 of the U-shaped hook part 23b is disposed forward in the wiping direction with respect to the center Ct2 of the blade rubber 50.

Accordingly, at the time of each of forward wiping and return wiping of the wiper blade 30, it is possible to correctly incline the blade rubber 50 with respect to the surface 11a. Therefore, the occurrence of issues such as the chatter phenomenon, poor reversing, premature wearing of rubber, and increased lift during high-speed traveling, etc., resulting from the blade rubber 50 being unable to correctly incline with respect to the surface 11a can be suppressed. The quietness of the wiper device 10 can be easily facilitated without adding a new part (such as the conventional arm cover).

In addition, according to the wiper device 10 according to the embodiment, the inclination mechanism TM1 is provided at the wiper blade 30. The inclination mechanism TM1 includes the clip member 41 installed to the U-shaped hook part 23b and the vertebra holding member 42 having the linking pin 42d rotatably linked with the clip member 41 and supporting the blade rubber 50, and the linking pin 42d is inclinable in the wiping direction with respect to the clip member 41.

Accordingly, by simply changing the shape of the clip member 41, the inclination mechanism TM1 able to suppress the occurrence of the chatter phenomenon can be realized. Accordingly, it is possible to carry out the manufacture easily without increasing the number of parts.

Moreover, according to the wiper device 10 according to the embodiment, the clip member 41 has the engagement concave part 41h engaged with the linking pin 42d, the pin support part 41m supporting the longitudinal direction central part of the linking pin 42d is provided at the longitudinal direction central part of the engagement concave part 41h, and the taper parts 41n whose gaps with the linking pin 42d gradually increase as the distance from the pin support part 41m increases are provided on the two sides of the pin support part 41m in the longitudinal direction of the engagement concave part 41h.

Accordingly, the clip member 41 can be manufactured easily without complicating the shape of the clip member 41. In addition, since the shape of the clip member 41 can be prevented from being complicated, it is possible to suppress the complexity of the mold for molding the clip member 41, and it is possible to increase the mold service time.

In addition, according to the wiper device 10 according to the embodiment, the clip member 41 includes the connection part 41f extending in the longitudinal direction of the wiper blade 30, and the vertebra holding member 42 has the inner wall part 42c extending in the longitudinal direction of the wiper blade 30 and abutted against by the connection part 41f.

Accordingly, unnecessary deflection of the wiper device 10 with respect to the direction of the broken arrow of FIG. 8 can be suppressed. Therefore, it is possible to effectively suppress the occurrence of the chatter phenomenon due to unnecessary deflection.

In addition, according to the wiper device 10 according to the embodiment, since the manufacture can be easily carried out without increasing the number of parts, it is possible to suppress the energy consumption in connection with the manufacture.

Accordingly, it is possible to contribute to Sustainable Development Goals (SDGs) advocated by the United Nations, particularly Goal 7 (ensure access to affordable, reliable, sustainable and modern energy) and Goal 13 (take urgent action to combat climate change and its impacts).

Then, Embodiment 2 of the invention will be described in detail with reference to the drawings. It is noted that like symbols are labeled for components having like functions of Embodiment 1, and detailed descriptions thereof are omitted.

Figure 12:
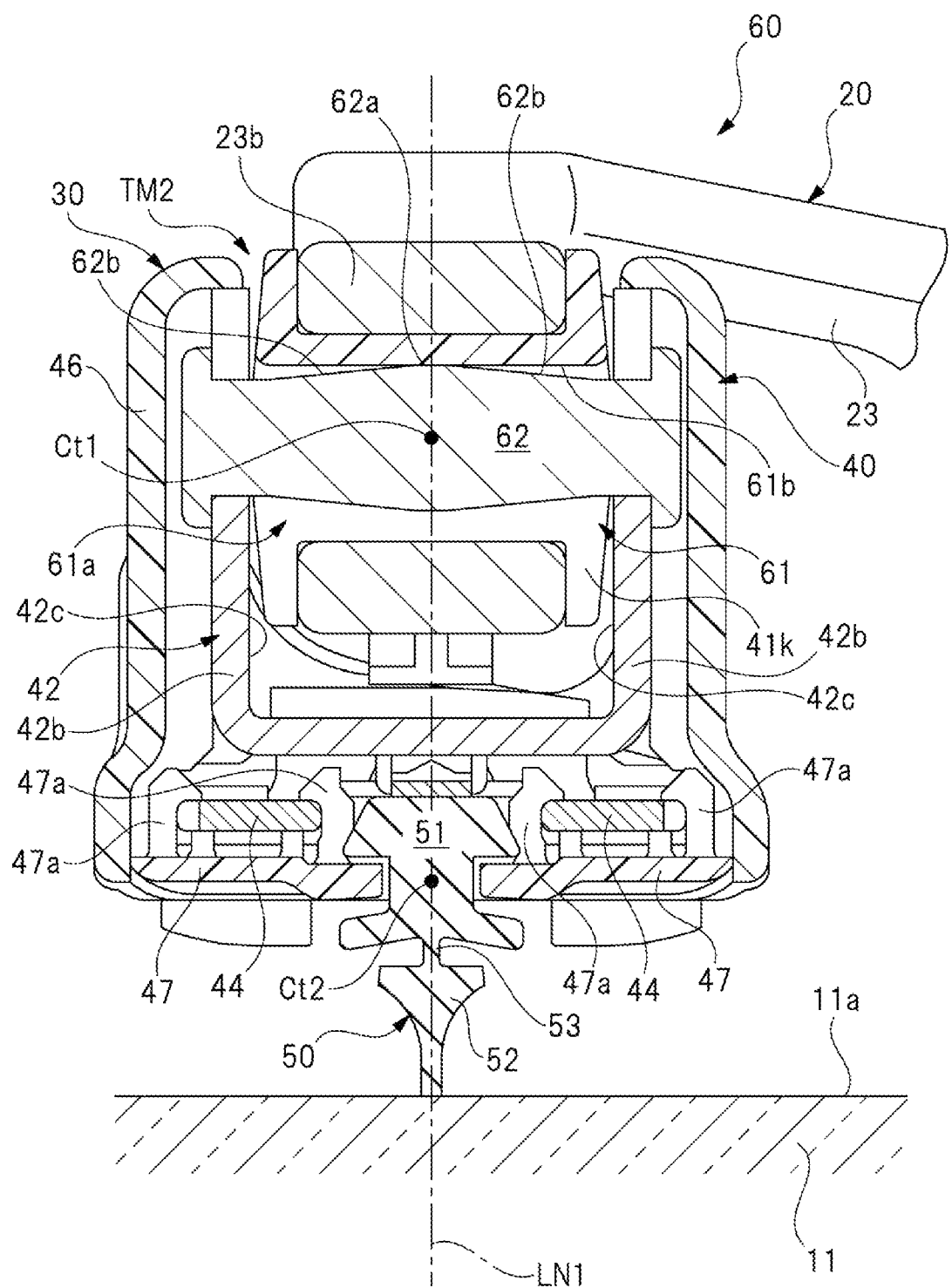
FIG. 12 is a view illustrating a wiper device of Embodiment 2 and corresponding to FIG. 2.
Figure 13:
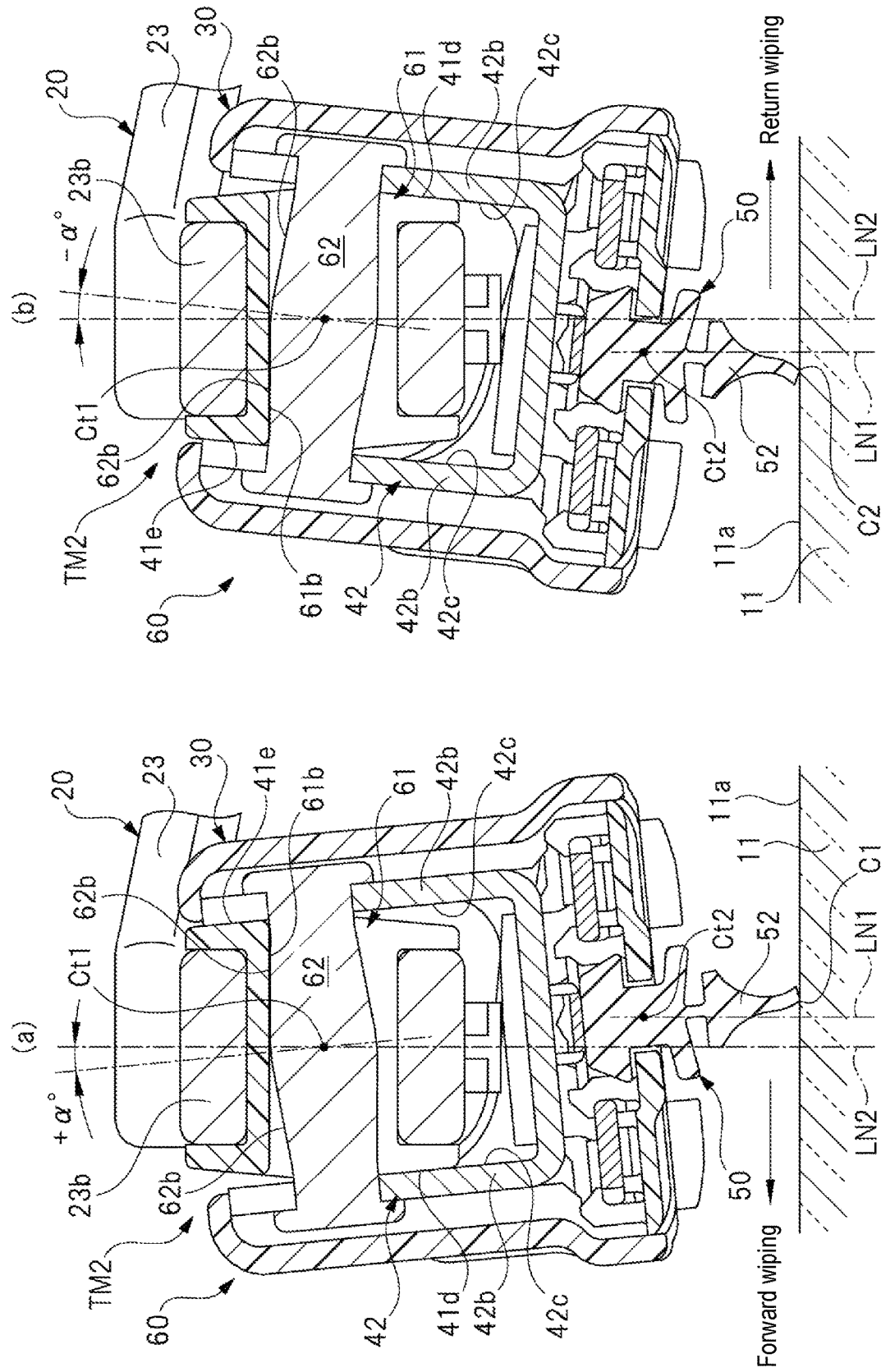
In FIG. 13, (a) and (b) of FIG. 13 are cross-sectional views illustrating an operation of the wiper device according to Embodiment 2.

FIG. 12 is a view illustrating a wiper device of Embodiment 2 and corresponding to FIG. 2. In FIG. 13, (a) and (b) of FIG. 13 are respectively cross-sectional views illustrating an operation of the wiper device according to Embodiment 2.

As shown in FIG. 12 and (a) and (b) of FIG. 13, compared with the wiper device 10 (see FIG. 2) of Embodiment 1, the configuration of an inclination mechanism TM2 in a wiper device 60 of Embodiment 2 is different. Specifically, a clip member 61 forming the wiper device 60 includes a groove part 61a extending straight in the axial direction of a linking pin 62, and an engagement concave part 61b and the opening part 41k are provided in the groove part 61a. Here, in the engagement concave part 61b of Embodiment 2, the pin support part 41m or the pair of taper parts 41n (see FIG. 2) as in Embodiment 1 are not provided. That is, the engagement concave part 61b extends straight in the axial direction of the linking pin 62.

Here, the inclination mechanism TM2 includes the clip member 61 installed to the U-shaped hook part 23b of the arm piece 23 and the vertebra holding member 42 having the linking pin 62 rotatably linked with the clip member 61 and supporting the blade rubber 50.

Meanwhile, the linking pin 62 is formed in a substantial barrel shape, and has a large diameter part 62a in which the longitudinal direction central part thereof has the longest diameter. On the two sides of the large diameter part 62a in the longitudinal direction (axial direction) of the linking pin 62, taper parts 62b whose gaps with the engagement concave part 61b gradually increase as the distance from the large diameter part 62a increases are formed. Accordingly, as shown in FIG. 12 and (a) and (b) of FIG. 13, inside the engagement concave part 61b, the linking pin 42d is swingable like a seesaw.

In this way, in Embodiment 2, the shape of the linking pin 62 and the shape of the engagement concave part 61b are swapped as compared to the case of Embodiment 1 (see FIG. 1). Specifically, in Embodiment 1, the pair of taper parts 41n are provided at the engagement concave part 41h of the clip member 41, and the linking pin 42d is in a simple cylindrical columnar shape. However, in Embodiment 2, the pair of taper parts 62b are provided at the linking pin 62, and the engagement concave part 61b is arranged in a shape extending straight in the axial direction of the linking pin 62.

In addition, as shown in (a) of FIG. 13, "at the time of forward wiping" of the wiper device 60, the taper part 62b on the side (right side in the figure) opposite to the forward wiping direction side in the pair of taper parts 62b of the linking pin 62 abuts against the bottom part of the engagement concave part 61b. In addition, the first inclined surface 41d on the forward wiping direction side (left side in the figure) abuts against the inner wall part 42c, and the second inclined surface 41e on the side (right side in the figure) opposite to the forward wiping direction side abuts against the inner wall part 42c.

In addition, as shown in (b) of FIG. 13, "at the time of return wiping" of the wiper device 60, the taper part 62b on the side (left side in the figure) opposite to the return wiping direction side in the pair of taper parts 62b of the linking pin 62 abuts against the bottom part of the engagement concave part 61b. In addition, the first inclined surface 41d on the return wiping direction side (right side in the figure) abuts against the inner wall part 42c, and the second inclined surface 41e on the side (left side in the figure) opposite to the return wiping direction side abuts against the inner wall part 42c.

In the wiper device 60 of Embodiment 2 formed as the above as well, effects substantially the same as those of the wiper device 10 (see FIG. 2) of Embodiment 1 can be attained. In addition, compared with Embodiment 1, the shape of the clip member 61 (shape of the engagement concave part 61b) in Embodiment 2 can be arranged to be straight and simplified. Therefore, it is possible to more easily manufacture the clip member 61.

Then, Embodiment 3 of the invention will be described in detail with reference to the drawings. It is noted that like symbols are labeled for components having like functions of Embodiment 1, and detailed descriptions thereof are omitted.

Figure 14:
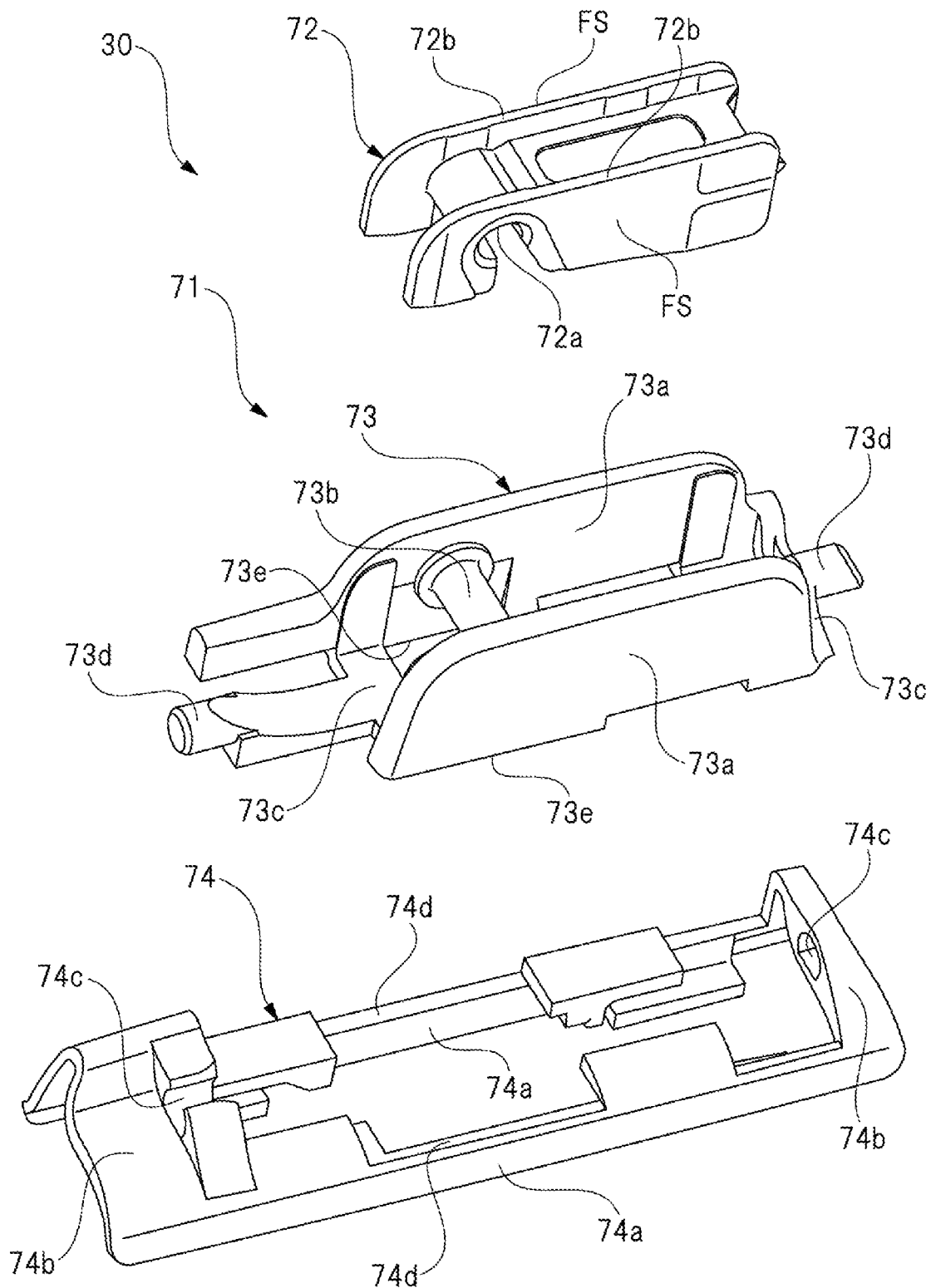
FIG. 14 is a view illustrating a wiper device of Embodiment 3 and corresponding to FIG. 7.
Figure 15:
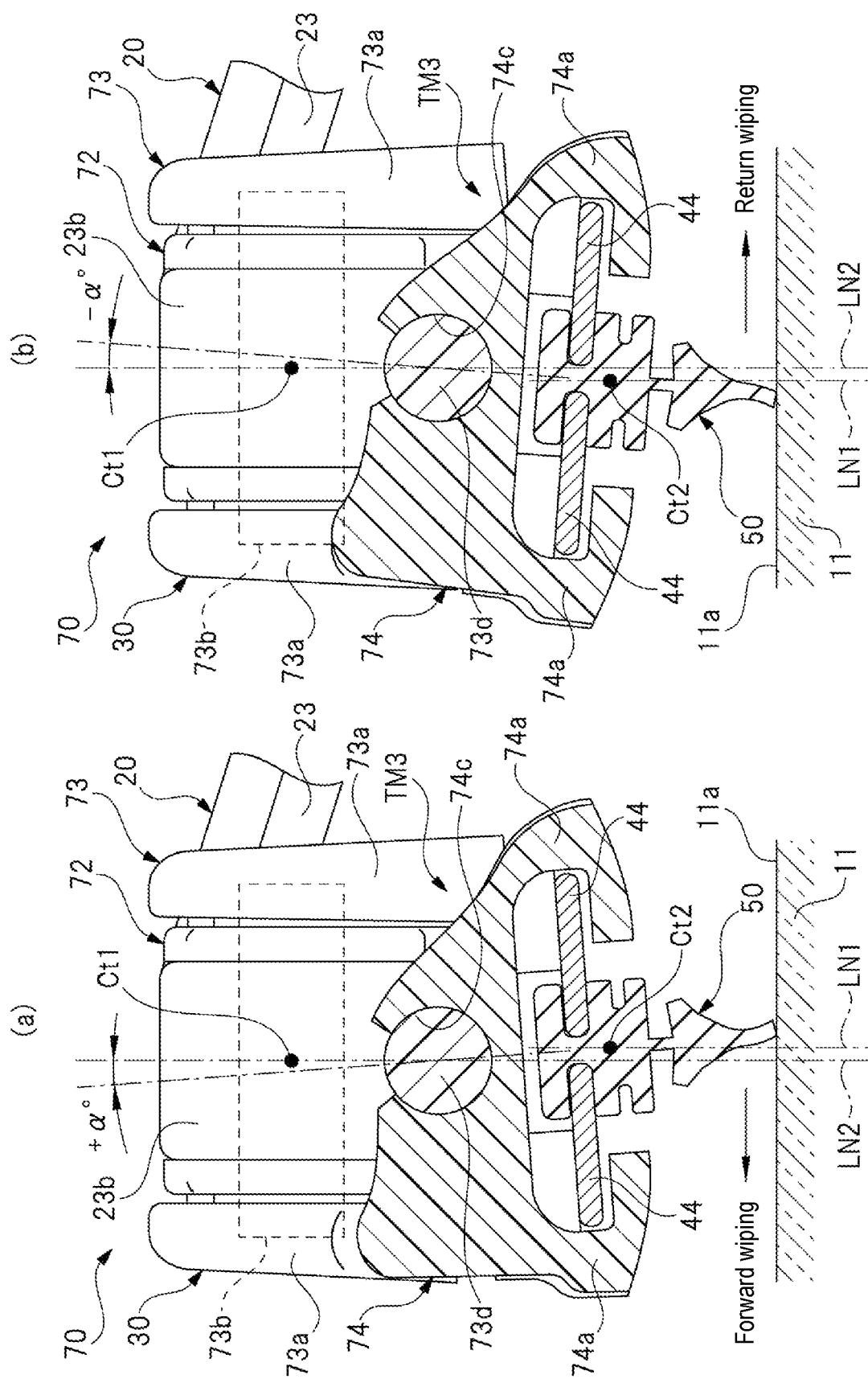
In FIG. 15, (a) and (b) of FIG. 15 are cross-sectional views illustrating an operation of the wiper device according to Embodiment 3.

FIG. 14 is a view illustrating a wiper device of Embodiment 3 and corresponding to FIG. 7. In FIG. 15, (a) and (b) of FIG. 15 are respectively cross-sectional views illustrating an operation of the wiper device according to Embodiment 3.

As shown in FIG. 14 and (a) and (b) of FIG. 15, compared with the wiper device 10 (see FIG. 2) of Embodiment 1, the configuration of an inclination mechanism in a wiper device 70 of Embodiment 3 is different. Specifically, the inclination mechanism TM1 (see FIG. 2) of Embodiment 1 is formed by using the clip member 41 and the vertebra holding member 42 forming the rubber holder 40. Comparatively, an inclination mechanism TM3 of Embodiment 3 is formed by a clip member 72, a first support member 73, and a second support member 74 forming a rubber holder 71. In this way, a wiper blade (details of which are not shown) like that of Embodiment 1 is also provided in the inclination mechanism TM3 of Embodiment 3.

As shown in FIG. 14, the clip member 72 includes an engagement concave part 72a. The engagement concave part 72a, like the engagement concave part 61b (see FIG. 12) of the clip member 61 of Embodiment 2, does not include the pin support part 41 and the pair of taper parts 41n (see FIG. 2) like Embodiment 1. That is, the engagement concave part 72a simply extends straight in the axial direction of a linking pin 73b.

In addition, a pair of sidewall parts 72b forming the clip member 72 are not provided with the first inclined surface 41d and the second inclined surface 41e (see (a) and (b) of FIG. 11 and (a) and (b) of FIG. 13) as in Embodiment 1 and Embodiment 2. That is, the outer sides of the pair of sidewall parts 72b are formed as simple flat surfaces FS. The remaining shape of the clip member 72 is the same as those of Embodiment 1 and Embodiment 2.

In a direction intersecting with the longitudinal direction of the rubber holder 71, the first support member 73 includes a pair of pin support walls 73a facing each other. In addition, the linking pin 73b formed by a round steel rod is provided across between the pair of pin support walls 73a. Here, the linking pin 73b is also formed in a simple cylindrical columnar shape. That is, different from Embodiment 1 and Embodiment 2, the linking pin 73b does not swing like a seesaw inside the engagement concave part 72a.

Between the pair of pin support walls 73a, a pair of bridging parts 73c are integrally provided. Specifically, one of the bridging parts 73c is disposed in the vicinity of the linking pin 73b, and the other bridging part 73c is disposed at a position away from the linking pin 73b. In addition, a rotation shaft 73d formed in a substantially cylindrical columnar shape is integrally provided at each of the pair of bridging parts 73c. The rotation shafts 73d extend in the axial direction of the rubber holder 71 (the left-right direction of FIG. 14). That is, the axial direction of the rotation shaft 73d and the axial direction of the linking pin 73b are orthogonal to each other.

In addition, on the side of the second support member 74 of each of the pin support walls 73a (lower side of FIG. 14), a first limitation part 73e is provided. The pair of first limitation parts 73e are able to abut against a pair of second limitation parts 74d provided at the second support member 74. The first limitation parts 73e and the second limitation parts 74d are equivalent to the inclination angle limitation part which limits the maximum inclination angle of the second support member 74 with respect to the first support member 73, that is, the maximum inclination angle of the wiper blade 30 with respect to the surface 11a (see (a) and (b) of FIG. 15).

The second support member 74 includes a pair of first side members 74a extending in the longitudinal direction of the rubber holder 71 and, at the ends of the first side members 74a in the longitudinal direction, a pair of second side members 74b connecting the first side members 74a. That is, as shown in FIG. 14, the second support member 74 is formed in a substantially rectangular shape in which the central portion is open.

In addition, in the pair of second side members 74b, shaft support parts 74c which respectively rotatably support the pair of rotation shafts 73d provided at the first support member 73 are respectively provided integrally. Accordingly, the second support member 74 is rotatable, with the rotation shafts 73d as the center, with respect to the first support member 73. In other words, the second support member 74 is swingable with respect to the first support member 73 in the wiping direction.

In addition, on the sides of the first support member 73 in the pair of first side members 74a, the second limitation parts 74d are provided. The pair of second limitation parts 74d are able to abut against the pair of first limitation parts 73e provided at the first support member 73.

Here, in the second support member 74, the pair of vertebrae 44 are fixed (details of which are not shown). The blade rubber 50 (see (a) and (b) of FIG. 15) is installed to the pair of vertebrae 44 fixed to the second support member 74. That is, the second support member 74 supports the blade rubber 50 via the pair of vertebrae 44.

In addition, "at the time of forward wiping" of the wiper device 70, the second support member 74 is inclined, with the rotation shafts 73d as the center, with respect to the first support member 73, and the position relationship between the center Ct1 of the U-shaped hook part 23b and the center Ct2 of the blade rubber 50 is as shown in (a) of FIG. 15. That is, the wiper blade is inclined by +α° with respect to the surface 11a of the windshield 11, so that the center Ct1 of the U-shaped hook part 23b moves forward (left side in (a) of FIG. 15) with respect to the center Ct2 of the blade rubber 50.

In addition, "at the time of return wiping" of the wiper device 70, the second support member 74 is inclined, with the rotation shafts 73d as the center, with respect to the first support member 73, and the position relationship between the center Ct1 of the U-shaped hook part 23b and the center Ct2 of the blade rubber 50 is as shown in (b) of FIG. 15. That is, the wiper blade is inclined by −α° with respect to the surface 11a of the windshield 11, so that the center Ct1 of the U-shaped hook part 23b moves forward (right side in (b) of FIG. 15) with respect to the center Ct2 of the blade rubber 50.

In the wiper device 70 of Embodiment 3 formed as the above as well, effects substantially the same as those of the wiper device 10 (see FIG. 2) of Embodiment 1 can be attained. In addition, compared with Embodiment 1, in Embodiment 3, the inclination center (rotation shafts 73d) of the wiper blade 30 with respect to the windshield 11 can be disposed on the side of the windshield 11 with respect to the linking pin 73b. Therefore, it is possible to easily apply Embodiment 3 to the so-called "aero wiper device" with a flat design having a low height dimension with respect to the windshield 11.

Then, Embodiment 4 of the invention will be described in detail with reference to the drawings. It is noted that like symbols are labeled for components having like functions of Embodiment 1, and detailed descriptions thereof are omitted.

Figure 16:
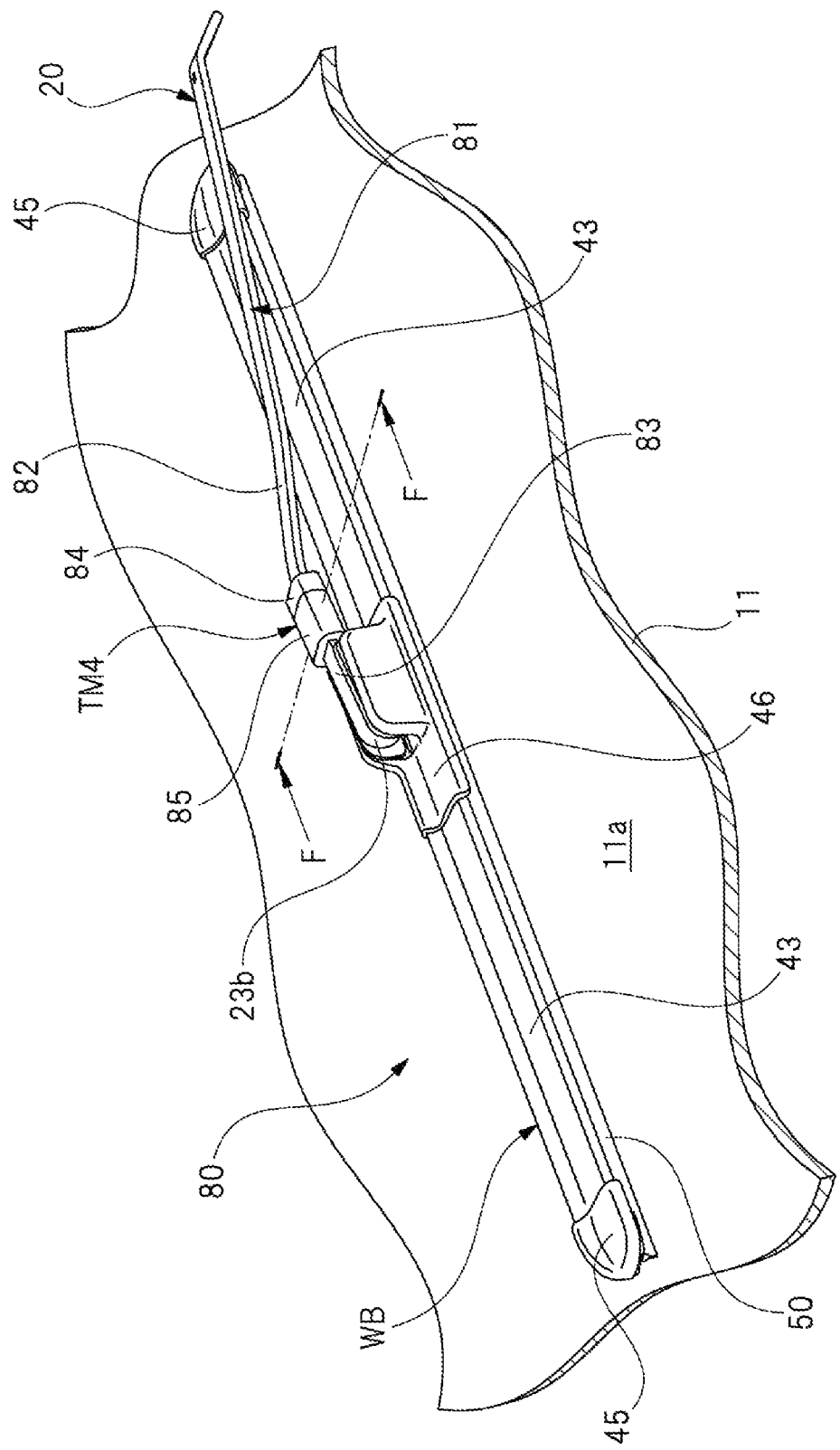
FIG. 16 is a perspective view illustrating a wiper device according to Embodiment 4.
Figure 17:
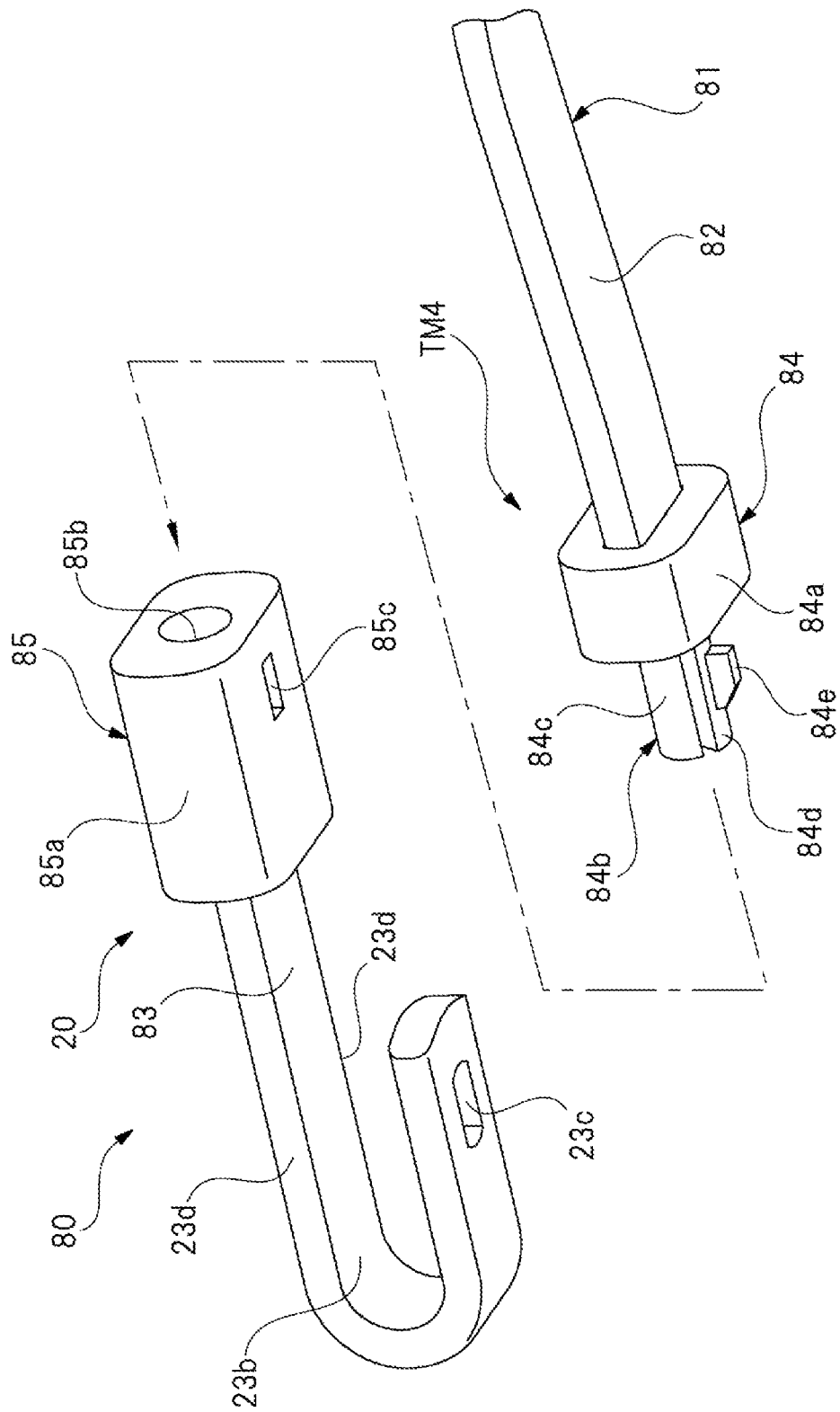
FIG. 17 is an exploded perspective view illustrating an inclination mechanism of the wiper device of FIG. 16.
Figure 18:
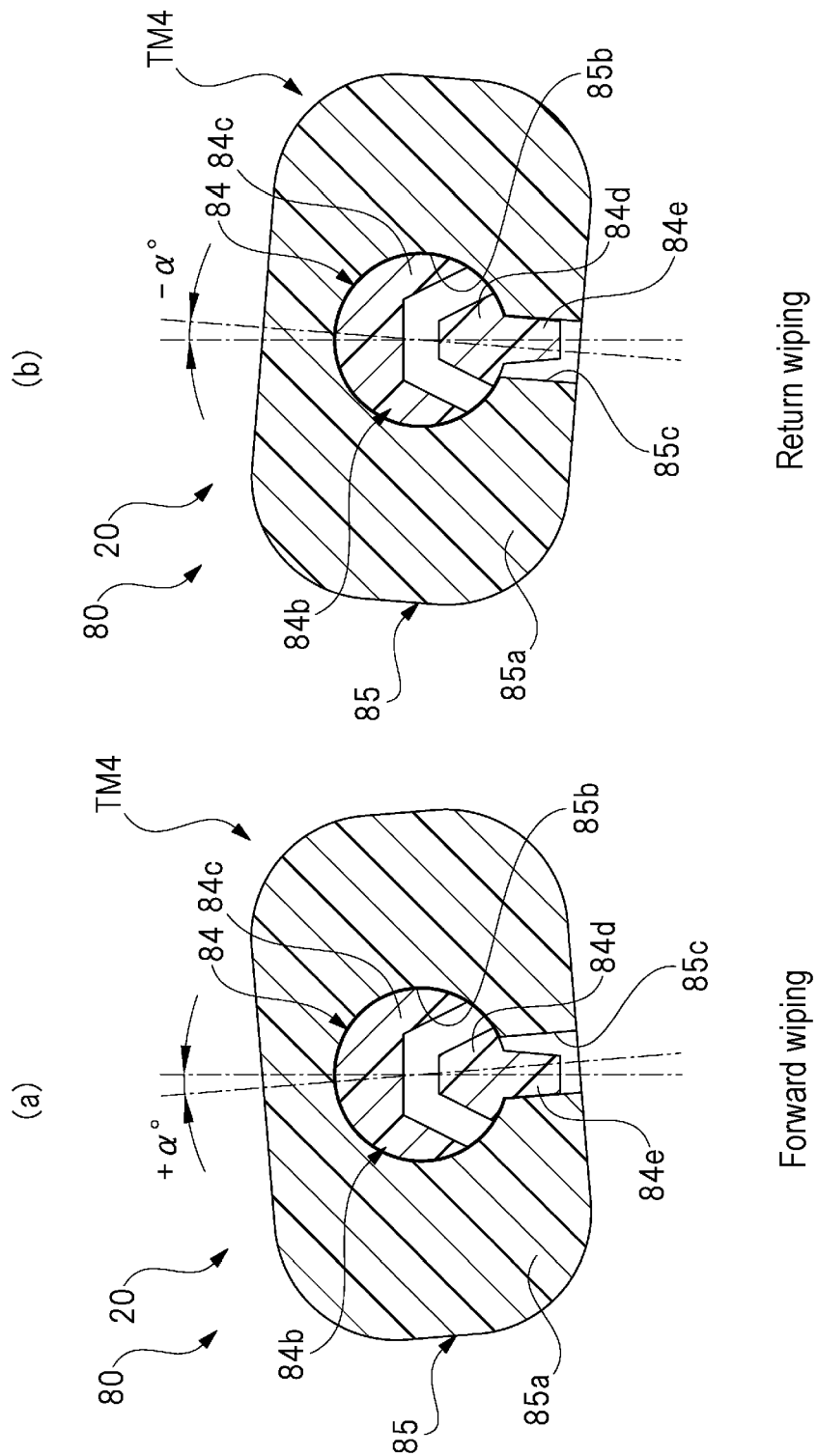
In FIG. 18, (a) and (b) of FIG. 18 are cross-sectional views illustrating an operation of the wiper device according to Embodiment 4 and taken along a line F-F of FIG. 16.

FIG. 16 is a perspective view illustrating a wiper device according to Embodiment 4. FIG. 17 is an exploded perspective view illustrating an inclination mechanism of the wiper device of FIG. 16. In FIG. 18, (a) and (b) of FIG. 18 are respectively cross-sectional views illustrating an operation of the wiper device according to Embodiment 4 and taken along a line F-F of FIG. 16.

As shown in FIG. 16 to (b) of FIG. 18, compared with the wiper device 10 (see FIG. 2) of Embodiment 1, the position where an inclination mechanism is provided and the configuration thereof in a wiper device 80 of Embodiment 4 are different. Specifically, in Embodiment 1, the inclination mechanism TM1 (see FIG. 2) is provided at the wiper blade 30. However, in Embodiment 4, an inclination mechanism TM4 is provided at the wiper arm 20. A wiper blade WB shown in FIG. 16 is a normal (general-purpose) wiper blade WB without an inclination mechanism.

Specifically, in Embodiment 4, the inclination mechanism TM4 is provided at an arm piece 81 forming the wiper arm 20. The arm piece 81 includes a first arm member 82 and a second arm member 83. The first arm member 82 is disposed on the side of the arm shank 22 (side of the swing shaft 12, see FIG. 1), and the second arm member 83 is disposed on the side of the wiper blade WB (side of the U-shaped hook part 23b).

As shown in FIG. 17, a first linking member 84 is installed to the side of the second arm member 83 in the longitudinal direction of the first arm member 82. The first linking member 84 includes a first body part 84a formed by a resin material such as plastics, and fixed to the first arm member 82. In addition, on the side of the second arm member 83 in the first body part 84a, a linking protrusion 84b inserted into a linking hole 85b provided at a second body part 85a of a second linking member 85 is integrally provided.

As shown in (a) and (b) of FIG. 18, the linking protrusion 84b includes an insertion body 84c in which a cross-section is substantially circular and an elastic piece 84d that is movable by exhibiting an elastic property in the radial direction thereof with respect to the insertion body 84c. In addition, in the elastic piece 84d, an engagement convex part 84e engaged with an engagement pore 85c provided in the vicinity of the linking hole 85b of the second body part 85a is integrally provided.

As shown in FIG. 17, the second linking member 85 linked with the first linking member 84 is installed to the side of the first arm member 82 in the longitudinal direction of the second arm member 83. The second linking member 85 includes the second body part 85a formed by a resin material such as plastics and fixed to the second arm member 83. In addition, on the side of the first arm member 82 of the second body part 85a, the linking hole 85b into which the linking protrusion 84b provided at the first body part 84a of the first linking member 84 is inserted is provided.

In addition, the linking protrusion 84b is inserted into the linking hole 85b so as not to rattle in the radial direction thereof, and the linking protrusion 84b is smoothly rotatable with respect to the linking hole 85b. Specifically, the second arm member 83 is swingable, with the linking hole 85b and the linking protrusion 84b as the center, with respect to the first arm member 82 within the predetermined angle range) (±α°) via the inclination mechanism TM4. That is, the second linking member 85 is swingable with respect to the first linking member 84 in the wiping direction. Here, the inclination mechanism TM4 is formed from the first linking member 84 and the second linking member 85.

Here, the engagement pore 85c engaged with the engagement convex part 84e of the elastic piece 84d is provided to be in communication with the linking hole 85b. The engagement convex part 84e movably enters the engagement pore 85c within the predetermined angle range (±α°). Specifically, as shown in (a) and (b) of FIG. 18, the linking convex part 84e enters the engagement pore 85c with a margin, so that the linking protrusion 84b swings within the angle range of ±α° with respect to the linking hole 85b. That is, in the embodiment, the engagement convex part 84e and the engagement hole 85c are equivalent to the inclination angle limitation part which limits the maximum inclination angle of the second arm member 83 and the wiper blade WB with respect to the surface 11a (see FIG. 16).

In addition, "at the time of forward wiping" as well as "at the time of return wiping" of the wiper device 80, the second arm member 83 and the wiper blade WB are inclined by +α° and −α° via the inclination mechanism TM4, and the second arm member 83 and the wiper blade WB are inclined by +α° and −α° with respect to the surface 11a of the windshield 11, so that the center (see Ct2 of (a) and (b) of FIG. 11) of the U-shaped hook part 23b moves forward with respect to the center (see Ct1 of (a) and (b) of FIG. 11) of the blade rubber 50.

In the wiper device 80 of Embodiment 4 formed as the above as well, effects substantially the same as those of the wiper device 10 (see FIG. 2) of Embodiment 1 can be attained. In addition, compared with Embodiment 1, in Embodiment 4, the inclination center (the linking hole 85b and the linking protrusion 84b) of the second arm member 83 and the wiper blade WB with respect to the windshield 11 can be disposed on the side opposite to the windshield 11 with respect to the linking pin. That is, the inclination center of the second arm member 83 and the wiper blade WB with respect to the windshield 11 can be away from the windshield 11. Therefore, it is possible to significantly (±α° or more) incline the second arm member 83 and the wiper blade WB with respect to the surface 11*a* of the windshield 11.

It goes without saying that the invention is not limited to the above-described embodiments, and that various modifications can be made without departing from the spirit of the invention. For example, although the wiper devices 10, 60, 70, 80 are shown as being applied to a vehicle such as an automobile in the respective embodiments, the invention is not limited thereto. The wiper devices 10, 60, 70, 80 are also applicable to an aircraft, a railway vehicle, a construction machinery, etc.

In addition, the material, shape, size, number, installation location, etc., of each component in each embodiment described above are arbitrary as long as the invention can be achieved, and are not limited to the respective embodiments described above.

What is claimed is:

1. A wiper device, wiping a wiping surface through a swing movement of a swing shaft, the wiper device comprising:
   a wiper arm, wherein a proximal end side is fixed to the swing shaft, and a blade installation part is provided on a distal end side;
   a wiper blade, having a blade rubber sliding on and contacting the wiping surface, and installed to the blade installation part; and
   an inclination mechanism, provided at the wiper arm or the wiper blade, and at least inclining the wiper blade with respect to the wiping surface so that a center of the blade installation part is disposed forward in a wiping direction with respect to a center of the blade rubber,
   wherein the inclination mechanism is provided at the wiper blade,
   the inclination mechanism comprises:
   a clip member, installed to the blade installation part; and
   a support member, having a linking pin rotatably linked to the clip member, and supporting the blade rubber, and
   the linking pin is inclinable in the wiping direction with respect to the clip member,
   wherein the clip member comprises:
   a first abutting part extending in a longitudinal direction of the wiper blade; and
   a pair of sidewall parts integrally provided with the clip member,
   the support member has a second abutting part extending in the longitudinal direction of the wiper blade and abutted against by the first abutting part,
   the first abutting part is connected with a first inclination surface and a second inclination surface provided on outer sides of the pair of sidewall parts,
   the first inclination surface is provided on a side of the wiping surface of the clip member, and
   the second inclination surface is disposed on a side opposite to the wiping surface of the clip member,
   wherein the clip member has an engagement concave part engaged with the linking pin,
   the engagement concave part has a groove part formed in a U shape,
   the groove part includes an opening part guiding engagement of the linking pin to the engagement concave part,
   a pin support part supporting a longitudinal direction central part of the linking pin is provided at a longitudinal direction central part of the engagement concave part, and
   on two sides of the pin support part in a longitudinal direction of the engagement concave part, taper parts whose gaps with the linking pin gradually increase as a distance from the pin support part increases are formed.

* * * * *